(12) United States Patent
Kokemohr

(10) Patent No.: US 9,811,933 B2
(45) Date of Patent: Nov. 7, 2017

(54) IMAGE EDITING USING SELECTIVE EDITING TOOLS

(71) Applicant: Google Inc., Mountain View, CA (US)

(72) Inventor: Nils Kokemohr, Hamburg (DE)

(73) Assignee: Google Inc., Mountain View, CA (US)

( * ) Notice: Subject to any disclaimer, the term of this patent is extended or adjusted under 35 U.S.C. 154(b) by 42 days.

(21) Appl. No.: 14/744,332

(22) Filed: Jun. 19, 2015

(65) Prior Publication Data

US 2015/0371422 A1    Dec. 24, 2015

Related U.S. Application Data

(60) Provisional application No. 62/015,314, filed on Jun. 20, 2014.

(51) Int. Cl.
*G06T 11/60* (2006.01)
*G06K 9/03* (2006.01)
*G06T 5/00* (2006.01)

(52) U.S. Cl.
CPC .............. *G06T 11/60* (2013.01); *G06K 9/033* (2013.01); *G06T 5/00* (2013.01)

(58) Field of Classification Search
CPC ............ G06T 11/60; G06T 5/00; G06K 9/033
USPC ......................................................... 382/311
See application file for complete search history.

(56) References Cited

U.S. PATENT DOCUMENTS

| | | | |
|---|---|---|---|
| 6,344,907 B1 | 2/2002 | Watanabe et al. | |
| 6,434,277 B1 * | 8/2002 | Yamada | G06T 11/60 345/419 |
| 7,062,497 B2 | 6/2006 | Hamburg et al. | |
| 7,071,948 B2 | 7/2006 | Wilensky | |
| 7,730,043 B1 | 6/2010 | Bourdev | |
| 2005/0216841 A1 | 9/2005 | Acker et al. | |
| 2007/0196028 A1 | 8/2007 | Kokemohr et al. | |
| 2008/0275922 A1 * | 11/2008 | Hertzfeld | G06F 3/04845 |
| 2009/0207254 A1 | 8/2009 | Tomat et al. | |
| 2010/0058244 A1 | 3/2010 | Wang | |

(Continued)

FOREIGN PATENT DOCUMENTS

| | | |
|---|---|---|
| WO | 0036501 A1 | 6/2000 |
| WO | 2013192276 A2 | 12/2013 |

OTHER PUBLICATIONS

Anonymous. "Capture NX2 User's Manual." http://cnd-10.nikon-cdn.com/pdf/manuals/software/CapNX2/CAPNX2-UM-EN.pdf. pp. 1-268. Jan. 1, 2008.

(Continued)

*Primary Examiner* — Amandeep Saini
(74) *Attorney, Agent, or Firm* — IP Spring

(57) ABSTRACT

Implementations relate to editing images with selective editing tools. In some implementations, a computer-implemented method for an image editing program causes a display of an image and receives user input from a user to the image editing program, the user input indicative of selection of a selective editing tool. The method restores the image to a previous state in which a first modification to one or more pixel values of the image is omitted, where the first modification resulted from previous application of a first edit operation to the image. The method applies a second edit operation to one or more local areas of the image as indicated by selection of the selective editing tool by the user input, and the applying causes a second modification to the image.

20 Claims, 7 Drawing Sheets

(56) References Cited

U.S. PATENT DOCUMENTS

| | | | | |
|---|---|---|---|---|
| 2011/0102457 | A1* | 5/2011 | Bhatt | G06F 3/0481 345/619 |
| 2012/0063680 | A1* | 3/2012 | Daisy | G06T 7/0051 382/165 |
| 2013/0235071 | A1 | 9/2013 | Ubillos et al. | |
| 2013/0346898 | A1 | 12/2013 | Kokemohr | |
| 2014/0071045 | A1* | 3/2014 | Muchnick | G06F 3/04845 345/156 |

OTHER PUBLICATIONS

European Patent Office. International Search Report and Written Opinion for International Patent Applicatioin No. PCT/US2015/036621. 10 pages. dated Sep. 14, 2015.

Willis, David. "Mastering Control Points." Digital Photo Magazine. Werner Publishing Corp. Aug. 16, 2011.

Dove, Jackie."Google+ snaps Snapseed into Chrome browser." http://www.techhive.com/article/2048631/google-snaps-snapseed-into-chrome-browser.html. All pages. Sep. 12, 2013.

"Photoshop CS3 User Guide." Adobe Systems Inc. pp. i-vii, 1-674. 2007.

"Nikon Capture NX2 User Manual." Nik Software, Inc. pp. 1-263. 2008.

"Corel PaintShop Pro X6 User Guide." Corel Corporation. pp. 1-218. 2013.

U.S., International Search Report and Written Opinion for International Patent Application No. PCT/US2013/046487, dated May 27, 2014, 7 pages.

International Bureau of WIPO, International Report on Patentability for International Patent Application No. PCT/US13/46487, dated Dec. 23, 2014, 5 pages.

International Bureau of WIPO, International Preliminary Report on Patentability for International Patent Application No. PCT/US2015/036621, dated Dec. 20, 2016, 7 pages.

U.S., First Action Interview, Pre-Interview Communication for U.S. Appl. No. 13/920,555, dated Apr. 7, 2015, 5 pages.

U.S., Notice of Allowance for U.S. Appl. No. 13/920,555, dated Nov. 4, 2015, 7 pages.

U.S., First Action Interview Office Action Summary for U.S. Appl. No. 13/920,555, dated Aug. 18, 2015, 8 pages.

* cited by examiner

IMAGE EDITING USING SELECTIVE EDITING TOOLS

CROSS REFERENCE TO RELATED APPLICATIONS

The present application claims priority to U.S. Provisional Application No. 62/015,314, filed Jun. 20, 2014, which is incorporated herein by reference in its entirety.

BACKGROUND

The popularity and convenience of digital cameras as well as the widespread of use of Internet communications have caused digital images to become ubiquitous. For example, digital photographs are commonly captured by camera devices and cameras included in other portable devices such as phones, tablet computers, wearable devices, etc. Photos are also often posted to various Internet sites, such as web pages, social networking services, etc. for users and others to view. However, many images, such as photographs taken by a camera, can include characteristics unsatisfying to a user or other characteristics that the user may wish to change in any of a variety of different ways. To improve or change such images, a user commonly edits the images directly by opening an image in an editor program and manually selecting and adjusting various characteristics of pixels of the image, such as brightness, contrast, saturation, blur, etc.

SUMMARY

Implementations relate to editing images with selective editing tools. In some implementations, a computer-implemented method for an image editing program. The method may cause a display of an image, and receive user input from a user to an image editing program, the user input indicative of selection of a selective editing tool. The method may restore the image to a previous state in which a first modification to one or more pixel values of the image is omitted, where the first modification resulted from previous application of a first edit operation to the image. The method may apply a second edit operation to one or more local areas of the image as indicated by selection of the selective editing tool by the user input, where the applying causes a second modification to the image.

Various implementations and examples of the method are described. For example, the method can cause a display of the image after applying the second edit operation to the one or more local areas, where the display of the image includes the second modification. In some examples, the first edit operation can be the same as the second edit operation. The method can include applying the first edit operation to the image to cause the first modification to the one or more pixel values of the image, prior to the restoring and applying, where the first edit operation is applied without use of the selective editing tool. The first edit operation can be a last edit operation applied to the image prior to the applying of the second edit operation to one or more local areas of the image, or can be a previous edit operation applied to the image prior to the applying of the second edit operation and prior to the applying of one or more other edit operations to the image. The restoring of the image to the previous state can be performed in response to receiving the user input indicative of selection of the selective editing tool.

The method can include providing a displayed menu including one or more edit options to select one of a plurality of edit operations for use with the selective editing tool, where the plurality of edit operations were previously applied to the image. For example, the first edit operation can be a previously-applied edit operation, and the method can further include providing a displayed menu including one or more edit options including a first edit option to apply a default edit operation using the selective editing tool, and a second edit option to apply the previously-applied edit operation using the selective editing tool, where the restoring the image to the previous state is performed based on a selection of the second edit option by the user input indicative of the selection of the selective editing tool. In some implementations, a plurality of types of selective editing tool can be available for selection, where each of one or more of the plurality of types of selective editing tool can be operative to be associated for use with a plurality of predetermined edit operations.

The user input using the selective editing tool can be received while the selective editing tool is active, where the user input identifies the one or more local areas. The selective editing tool can indicate the one or more local areas based on input derived from user contact with a touchscreen, user manipulation of a physical input device, and/or a voice command from the user. The selective editing tool can include a brush tool, an image gradient tool, a control point tool, and/or a smart selection tool. For example, the selective editing tool can include a brush tool, where a number of pixels of the image in the one or more local areas are identified by the user input using the brush tool and are modified based on the second edit operation applied to the one or more local areas. The selective editing tool can include a control point tool causing a control point to be located on the image based on the user input using the selective editing tool, where applying the second edit operation to the one or more local areas can include modifying pixels of the image around the control point within a predetermined distance of the control point. The first edit operation and/or second edit operation can include a color modifier, a brightness modifier, a contrast modifier, a saturation modifier, a blur, a sharpness modifier, a noise modifier, and/or a special effect filter. The method can further include displaying an indication of a sequence of multiple edit operations applied to the image prior to the applying of the second edit operation to the one or more local areas, and wherein the user input selects the second edit operation from the displayed sequence of multiple edit operations prior to the restoring and the applying.

In some implementations, a system to provide an image editing program can include a storage device and at least one processor operative to access the storage device. The processor may be configured to apply a first edit operation to an image to cause a modification to one or more pixel values of the image based on user input received from a user in the image editing program, and receive input from a user to the image editing program, where the user input selects the selective editing tool. The processor may be configured to restore the image to a previous state in which the modification resulting from the applying of the first edit operation to the image is omitted, and apply a second edit operation to one or more local areas of the image as indicated by selection of the selective editing tool by the user input. The processor may be configured to cause display by a display device of the image modified by the second edit operation applied to one or more local areas.

Various implementations and examples of the system are described. For example, the first edit operation can be the same as the second operation. The processor can be further configured to cause display of the image modified by the first edit operation, prior to the processor restoring the image to the previous state, where the restoring of the image to the previous state is performed in response to receiving the user input indicating selection of the selective editing tool. The user input can identify the one or more local areas, and the selective editing tool can include a brush tool, an image gradient tool, a control point tool, and/or a smart selection tool.

In some implementations, a computer readable medium can have stored thereon instructions to implement an image editing program. The instructions, when executed by a processor, may cause the processor to apply a first edit operation to the image to cause a modification in the image, receive input from the user selecting the selective editing tool, and restore the image to a previous state in which the modification resulting from the application of the first edit operation to the image is omitted. The instructions may cause the processor to apply a second edit operation to one or more local areas of the image as indicated by selection of the selective editing tool by the user input to cause a second modification to the image in the one or more local areas. The instructions may cause the processor to provide a display of the image including the second modification. In some implementations, the user input can identify the one or more local areas, where the selective editing tool can include a brush tool, an image gradient tool, a control point tool, and/or a smart selection tool.

DETAILED DESCRIPTION

Figure 1:
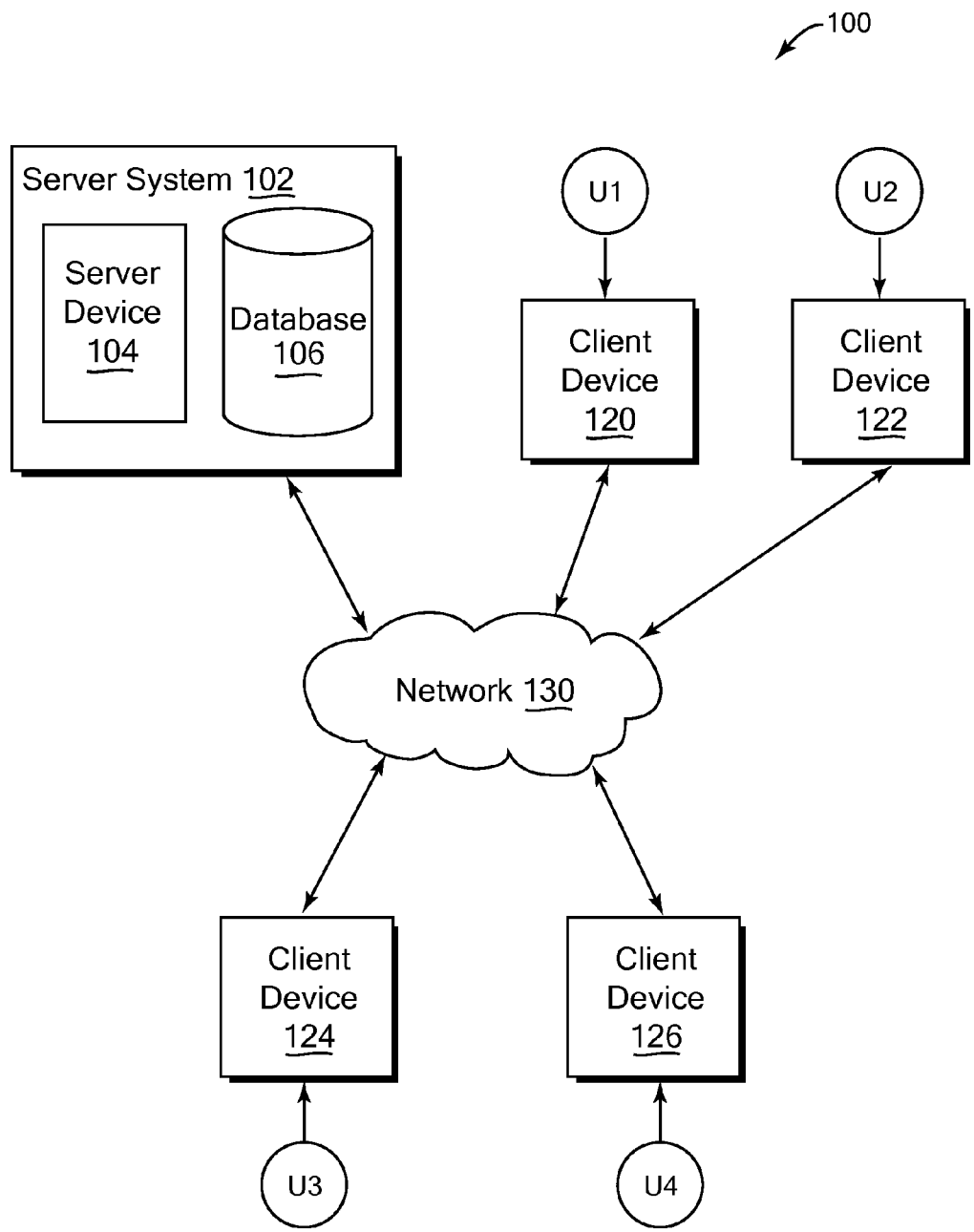
FIG. 1 is a block diagram of an example network environment which may be used for one or more implementations described herein.

One or more implementations described herein relate to editing images with selective editing tools. In some implementations, a system can receive input from a user that selects a selective editing tool to edit an image in an editing program. The system can present an option to use the selective editing tool with an edit operation, e.g., that was previously applied to the image and caused a pixel modification in the image. In some examples, the previous edit operation may have been previously applied to the entire image, or to a portion of the image without use of a selective editing tool. If the user selects the presented selective editing tool option, the modification to the image from the edit operation can be omitted (e.g., removed) from the image.

The user can then selectively apply an edit operation, e.g., that same edit operation, to local areas of the image using the selective editing tool.

In some examples, the restoring of the image to the previous state can be performed in response to receiving the user input indicative of selection of the selective editing tool. The system can receive input from the user while the selective editing tool is active, and the user input can identify the one or more local areas of the image. User input can instruct application of the edit operation to the one or more local areas. In some examples, the selective editing tool can be directed to the one or more local areas based on input derived from user contact with a touchscreen, from user manipulation of a physical input device, from a user's voice command, etc. In some examples, the selective editing tool can be a brush tool, an image gradient tool, a control point tool, a smart selection tool, etc. The edit operation can include any filter or other image editing function to change one or more characteristics of the image, such as a color modifier, a brightness modifier, a contrast modifier, a saturation modifier, a blur, a sharpness modifier, a noise modifier, and a special effect filter. In some examples, the selectively applied edit operation can be the last edit operation applied to the image prior to the selection and/or use of the selective editing tool, or can be a different edit operation previously applied to the image. In some implementations, one or more selectively applied edit operations can be different than previously-applied edit operations.

Some implementations can display a menu including options to select one of multiple edit operations for use with the selective editing tool. For example, the menu can provide an option to apply a default edit operation using the selective editing tool and/or provide an option to apply a previously-applied edit operation using the selective editing tool and, in some cases, causing the removal of a modification resulting from the application of that previously-applied edit operation to the image. Some implementations can display an indication of a sequence of multiple edit operations applied to the image prior to the applying of an edit operation to the one or more local areas. In these implementations, the system can receive a selection of the edit operation to apply to the local areas from the displayed sequence of multiple edit operations. In some implementations, the system can display one or more options (e.g., in a menu) that each include multiple edit operations, or multiple options (and edit operations) can be selected by user input for use with the selective editing tool. This can allow the multiple selected edit operations to be applied to the local areas of the image with use of the selective editing tool.

Described features can allow a user to selectively edit an image in an editing program using editing functions that are intuitive and easy-to-use. For example, some implementations of the selective tool features described herein allow a user to selectively apply a complex edit operation (e.g., a special effect filter or complex edit operation involving several types of image changes) simply and easily by selecting an edit operation (e.g., the last edit operation) previously applied to the image, removing or omitting its modification from the image, and allowing the user to apply that same edit operation to identified areas of the image using a selective tool. Furthermore, the selective editing features described herein can display a list of edit operations in their sequence of previous application. Such display can allow simple determination and presentation of previously-applied edit operations. Furthermore, features allow greater efficiency in the use of system resources such as CPU, GPU, and memory. Thus, a technical effect of editing images as disclosed herein includes a reduction in time to edit images, thus saving a user time, energy, and resources for achieving edits to images. Another technical effect is a higher quality of edits to images resulting from complex edits being applied to images in a simpler and easier manner. A further technical effect includes greater efficiency in the use of system resources to provide image editing functions with a system.

In various implementations described herein, reference is made to "edit operations." As referred to herein, an edit operation can be an image processing operation or technique, e.g., a modifier or technique that modifies color, brightness, contrast, size, orientation, compression (which may not alter color), visible area (e.g., via cropping or other operation), or other characteristics of an image. In some examples, an edit operation modifies one or more pixels of an image, causing a visual change in the image that is displayed when the image is displayed. For example, an edit operation can modify one or more pixel values of the image to change pixel characteristics including one or more of color (e.g., in one or more of multiple color channels), hue, brightness or luminance, contrast, saturation, sharpness (e.g., detail of color edges in the image), structure (e.g., detail of texture in the image), noise (e.g., color noise reduction), or other characteristic. For example, pixel values can be color values (e.g., a color value for each of red, green, and blue color channels in an RGB color space, or other color channels in other color spaces), or brightness values for grayscale images, etc. In some cases, an edit operation can cause multiple changes to one or more pixel characteristics, such as modifying both color and brightness.

For example, an edit operation can be a filter which changes one or more pixel values based on one or more parameters of the filter. A filter can be an edit operation that modifies pixel values to change one or more of these pixel characteristics in a particular way, where the filter is applied to the image to make the modifications. For example, a "blur" filter can adjust the pixel values of groups of pixels to achieve a blur visual effect in the image. The example blur filter can have parameters such as kernel size, radius, etc. A "preset" can be a set of one or more edit operations (e.g., filters) provided with predetermined parameter values that are applied collectively to achieve a particular visual effect in the image. An image as referred to herein can be a standalone image, or can be an image in a series of images, e.g., a frame in a video sequence of frames. For example, implementations described herein can be used with a single image or with a series or video sequence of images.

FIG. 1 illustrates a block diagram of an example network environment 100, which may be used in some implementations described herein. In some implementations, network environment 100 includes one or more server systems, e.g., server system 102 in the example of FIG. 1. Server system 102 can communicate with a network 130, for example. Server system 102 can include a server device 104 and a database 106 or other storage device. Network environment 100 also can include one or more client devices, e.g., client devices 120, 122, 124, and 126, which may communicate with each other and/or with server system 102 via network 130. Network 130 can be any type of communication network, including one or more of the Internet, local area networks (LAN), wireless networks, switch or hub connections, etc. In some implementations, network 130 can include peer-to-peer communication between devices, e.g., using peer-to-peer wireless protocols.

For ease of illustration, FIG. 1 shows one block for server system 102, server device 104, and database 106, and shows four blocks for client devices 120, 122, 124, and 126. Server blocks 102, 104, and 106 may represent multiple systems, server devices, and network databases, and the blocks can be provided in different configurations than shown. For example, server system 102 can represent multiple server systems that can communicate with other server systems via the network 130. In some examples, database 106 and/or other storage devices can be provided in server system block(s) that are separate from server device 104 and can communicate with server device 104 and other server systems via network 130. Also, there may be any number of client devices. Each client device can be any type of electronic device, e.g., a desktop computer, laptop computer, portable/mobile device, cell phone, smart phone, tablet computer, television, TV set top box or entertainment device, wearable devices (e.g., display glasses or goggles, wristwatch, headset, armband, jewelry, etc.), personal digital assistant (PDA), media player, game device, etc. Some client devices may also have a local database similar to database 106 or other storage. In other implementations, network environment 100 may not have all of the components shown and/or may have other elements including other types of elements instead of, or in addition to, those described herein.

In various implementations, end-users U1, U2, U3, and U4 may communicate with server system 102 and/or each other using respective client devices 120, 122, 124, and 126. In some examples, users U1-U4 may interact with each other via applications running on respective client devices and/or server system 102, and/or via a network service, e.g., a social network service or other type of network service, implemented on server system 102. For example, respective client devices 120, 122, 124, and 126 may communicate data to and from one or more server systems such as system 102. In some implementations, the server system 102 may provide appropriate data to the client devices such that each client device can receive communicated content or shared content uploaded to the server system 102 and/or network service. In some examples, users U1-U4 can interact via audio or video conferencing, audio, video, or text chat, or other communication modes or applications. A network service implemented by server system 102 can include a system allowing users to perform a variety of communications, form links and associations, upload and post shared content such as images, text, video, audio, and other types of content, and/or perform other socially-related functions. For example, users can view content such as images sent or streamed to their client devices originating from a different client device via a server and/or network service, or originating from a server system and/or network service. In some implementations, a "user" can include one or more programs or virtual entities, as well as persons that interface with the system or network.

A user interface can enable display of images, video, data, and other content as well as communications, privacy settings, notifications, and other data on a client device 120, 122, 124, and 126. Such an interface can be displayed using software on the client device, software on the server device, and/or a combination of client software and server software executing on server device 104, e.g., application software or client software in communication with server system 102. The user interface can be displayed on an output device of a client device, such as a display screen. In some implementations, application programs running on a server system can communicate with a client device to receive user input at the client device and to output data such as visual data, audio data, etc. at the client device.

In some implementations, server system 102 and/or one or more client devices 120-126 can provide an image editing program. The image editing program may allow a system (e.g., client device or server system) to provide editing options for an image, some examples of which are described herein. The image editing program can provide an associated user interface that is displayed on a display of the server system or client device. The user interface may provide various options to a user to select editing options, display modes, etc.

Other implementations of features described herein can use any type of system and service. For example, any type of electronic device can make use of features described herein. Some implementations can provide features described herein on client or server systems disconnected from or intermittently connected to computer networks. In some examples, a client device having a display screen (or other display device) can display images and provide features and results as described herein that are viewable to a user.

Figure 2:
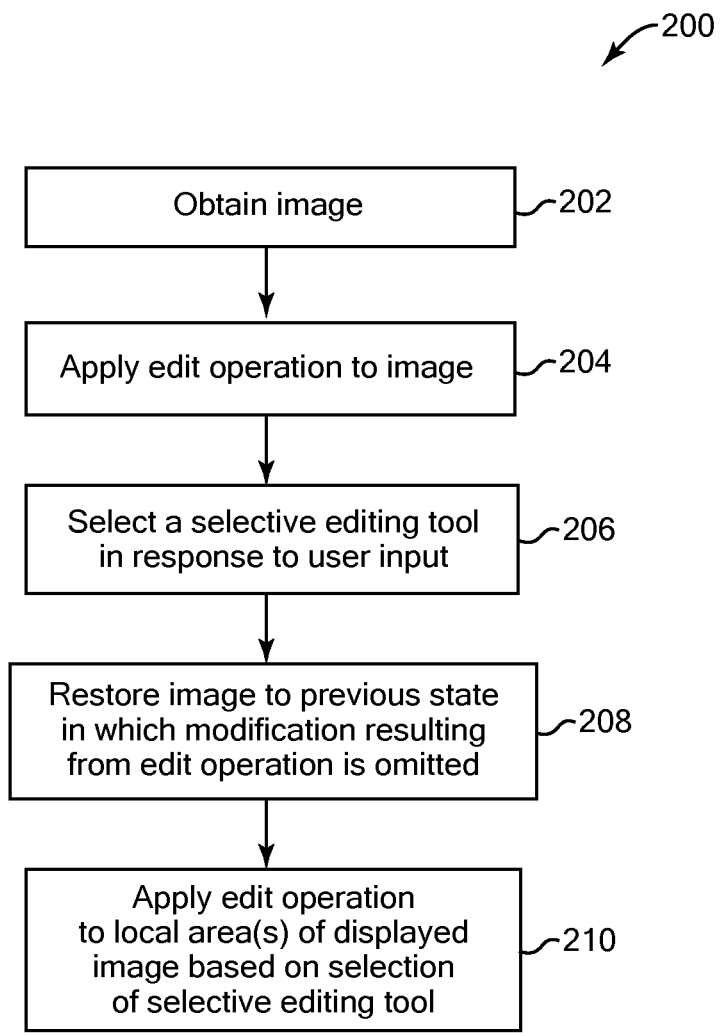
FIG. 2 is a flow diagram illustrating an example method to edit images using selective editing tools, according to some implementations.

FIG. 2 is a flow diagram illustrating an example method 200 to edit images using selective editing tools. In some implementations, method 200 can be implemented, for example, on a server system 102 as shown in FIG. 1. In other implementations, some or all of the method 200 can be implemented on a system such as one or more client devices, one or more server devices, and/or on both server device(s) and client device(s). In described examples, the implementing system includes one or more digital processors or processing circuitry ("processors"), and one or more storage devices such as a database 106 or other storage. In some implementations, different components of one or more servers and/or clients can perform different blocks or other parts of method 200.

In some implementations, method 200, or portions of the method, can be initiated based on user input. A user may, for example, have selected the initiation of the method 200 from an interface such as a user interface of an application, a social networking interface, or other interface. In other implementations, the method 200 can be initiated automatically by a system. For example, method 200 (or portions thereof) can be initiated based on one or more particular events or conditions such as a user opening an application, e.g., an editing application, receiving one or more images that have been newly uploaded to or accessible by the system, etc. In some implementations, such conditions can be specified by a user in custom preferences of the user. In some implementations, method 200 or portions thereof can be performed with guidance by the user. For example, a user can designate a set of multiple input images to be processed by method 200. In one example, method 200 (or portions thereof) can be performed on a camera, cell phone, or other client device that has captured one or more images. In addition or alternatively, a client device can send images to a server over a network, and the server can process the images using method 200, or the server can receive images from a different source (a different server, etc.).

In block 202 of method 200, the method obtains an image for editing. The image can be a digital image composed of multiple pixels, for example, and can be stored on one or more storage devices of the system performing method 200 or otherwise accessible to the method, e.g., a connected storage device, a local storage device, a storage device connected over a network, etc. For example, the image can be a photo captured by a camera, an image frame extracted from a captured video stream or other video data, or an image derived from a different source. In some implementations, a user can provide, select, or designate one or more input images to process. In other implementations, the image can be obtained by being automatically selected by the method, e.g., as an image from an album or other collection of multiple images, such as an album provided in an account of a user of a system or networking service. In some examples, the method can determine which image to obtain based on evaluating one or more characteristics of accessible images, such as the color distributions of images, timestamps and other metadata of images, and/or identified and recognized content depicted in the images, such as persons, faces, or objects. The image can be displayed on a display device in some implementations of method 200. For example, the image can be displayed by an image editing program or other program running on the system that can offer features described herein.

In block 204, the method applies an edit operation (or one or more edit operations) to the image to cause a modification in the image. For example, the edit operation can be applied in response to user input (e.g., instruction or command). In some examples, the method performs one or more edit operations to modify an image. In some implementations, the modification can be a modification to one or more pixel values in the image, e.g., that causes a visual modification to the image when it is displayed. In some implementations, user input can be provided in an image editing program displaying the image, for example. In various implementations, an edit operation can be any operation that can be applied to the image. For example, the edit operation can be a filter which modifies one or more pixel values of one or more pixels of the image to change color, brightness, contrast, saturation, and or other characteristic of the one or more pixels in the image. In some implementations, the edit operation can modify characteristics such as size (e.g., pixel resolution), orientation, compression, visible area (e.g., via cropping of portions of the image or other operation), or other characteristics.

In some implementations, the edit operation of block 204 is applied to the image without the use of a selective editing tool (described below). For example, an edit operation can be applied to the entire image, e.g., all the pixels of the image are processed by the edit operation. Such an application of an edit operation may affect all the pixels of the image in some cases, e.g., increase the brightness, particular hue, and/or other pixel characteristics of the pixels. In other cases or implementations, an edit operation can be applied to the entire image to process all the pixels of the image, but only a portion of the image (such as a subset of pixels in the image) is affected and results in being modified with a changed visual output (e.g., changed pixel values) caused from the application of the edit operation. For example, the edit operation may only affect some of the pixels of the image that satisfy one or more conditions or operations of the edit operation (e.g., an edit operation that affects red colored pixels may process green colored pixels but have no resulting affect on the green colored pixels). The edit operation of block 204 can also or alternatively be applied to local areas of the image via a selective editing tool.

In some implementations, one or more edit operations can be applied to a portion of the image in block 204, e.g., less than all the pixels of the image, such as one or more different subsets or groups of pixels in the image, etc. For example, an edit operation can be applied to image portions that are determined by the method based on predefined instructions included in the edit operation or predefined instruction provided to control the application of the edit operation, e.g., without manual user selection using a selective editing tool.

For example, predetermined instructions may instruct that the edit operation be applied to pixels in a particular region or area of the image such as a border, a predefined area around the center of the image, etc. In some examples, predetermined instructions may instruct that the edit operation be applied to pixels having a particular color or other characteristic, and/or applied to pixels having a particular depth range from a camera that captured the image (e.g., where the depth can be determined using depth data stored as metadata for the image). In some implementations, the edit operation can be applied to portions of the image based on output of one or more image analysis processes. For example, the edit operation can be applied based on detected features of the image as determined by one or more known image recognition techniques performed by the system implementing method 200 and/or by one or more other systems. For example, a face detection technique may provide an outline or bounding box for one or more faces detected in the image so that the edit operation can be applied only to the pixels of the detected faces (or only to pixels outside the detected faces). In another example, a skin smoothing edit operation may identify human facial skin in an image (e.g., based on face detection techniques and/or detecting skin color ranges) and apply a blur only to the facial skin. A "red eye correction" edit operation may identify red eyes in images and apply a modification to remove red color from just the eye pixels of the image, without receiving user selection. A landscape detection technique can provide locations where sky features, horizon lines, and landscape features are detected, e.g., without user selection, such that the edit operation can be applied only to pixels in one or more particular detected regions. Similarly, objects, animals, or other features can similarly be detected in the image using image recognition techniques and the borders or edges of these features used to guide application of the edit operation relative to these features. Some examples of edit operations are further described below with reference to FIG. 3. Other examples of edit operations that apply to less than the entire image (without user selection) may be possible.

In block 206, the method selects a selective editing tool in response to user input. For example, a user can indicate a particular selective editing tool in the user interface of an image editing program, which the method selects for use. For example, in some implementations, user input can indicate the editing tool by touch of user finger(s) on a screen position corresponding to a tool icon displayed on a touch screen. In other implementations, the user can select the displayed tool icon using a pointing device, e.g., a mouse, trackball, stylus, or other device. Other types of user input can provide selection, e.g., voice commands (using speech recognition techniques), eye-motion sensing and tracking, motion commands (using motion sensors such as accelerometers and/or gyroscopes of a device), touchscreen or motion gestures, etc. The selective editing tool can be any tool offered by the image editing program which allows the user to apply edit operations on particular areas, regions or pixels of the image, where those particular areas are selected by the user by using the tool. In some examples, the selective editing tool can be a brush tool which provides the user with the ability to modify pixels that are pointed to by a user, e.g., by a controlled pointer or cursor displayed in the editing interface, or by the user's finger or other appendage or object (e.g., a stylus) sensed by a touchscreen or other input sensing device. Other types of selecting editing tools can also be selected, some examples of which are described below. Some implementations can offer the user to select one of multiple types of presented edit operations which can each be used with the selective editing tool, including one or more previously-applied edit operations of block 204. In some implementations, one or more default edit operations can be offered and selected for the user, examples of which are described below.

In block 208, the method restores the image to a previous state in which modification resulting from the previous application of an edit operation in block 204 is omitted. For example, in some implementations, restoring the image to the previous state can include removing from the image modification resulting from the previous application of an edit operation to the image in block 204 (e.g., "removes the edit operation" from the image). For example, in some implementations the modification to one or more pixel values resulting from an edit operation performed on the image in block 204 can be removed from the image by changing those pixel values back to their previous values in the image. In some implementations, the restoring the image to a previous state can include rolling back one or more pixel values of the image from previous application of an edit operation to the image. In some implementations, restoring the image to a previous state can include retrieving and displaying a copy of the image in the previous state from memory or other storage device, where it had been stored prior to the previous application of the edit operation, and disregarding or discarding the image in the later state having the modification(s). Restoring the image can cause the image to be stored and/or displayed in the previous state before the edit operation was performed, e.g., the image is stored and/or displayed with pixels having pixel values before application of that edit operation to the image. In some implementations in which multiple edit operations were applied in block 204, one of these edit operations can be removed, e.g., the last edit operation that was applied to the image, or a previous edit operation applied at some point prior to the last edit operation. In some implementations, block 208 can remove multiple modifications in the image resulting from multiple previously-applied edit operations. \

In some implementations or situations, the restoring in block 208 can be performed automatically, e.g., without human intervention. In another situation, it may not be appropriate to restore the previous state of the image prior to the modification by the previous edit operation. For example, the same edit operation as the previous edit operation may be applied (e.g., in block 210 below) but with one or more different parameters (e.g., input by a user). In some cases, the system may intelligently determine that the previous edit operation should not be rolled back, and that the current edit operation (e.g., in block 210) should be applied with the different parameters. In another example, local areas (e.g., particular pixels) that were selectively modified by a previous edit operation in block 204 can be retained and may be modified by a different edit operation or different parameters to the same edit operation in block 210, such that restoring a previous state of the image is not appropriate. In some implementations, user input can select whether to retain the previous edit operation or to roll the image back to a previous state in block 208.

In some implementations, the method can provide a display of the image resulting from the omission of the edit operation(s) resulting from block 208. For example, the image can be displayed in a user interface of the image editing program or other application program, by a display device such as a display screen, projector, etc. For example, this can allow the user to view the updated image with a previous edit operation removed, ready to receive selective modifications as described below.

In block 210, the method modifies one or more local areas of the image identified by selection (e.g., use) of the selective editing tool by user input. For example, the modification of the one or more local areas in block 210 can be based on application of an edit operation that was previously applied in block 204 and its modification omitted (e.g., removed) from the image in block 208. For example, the edit operation is applied to cause a modification to the image in one or more local areas of the image based on user input provided via the selective editing tool. The edit operation makes this modification to the local areas, e.g., by changing pixel values of one or more pixels in the one or more local areas of the image, to cause a changed visual output for the changed pixels when the image is displayed. For example, in some implementations the local areas of the image can be one or more portions of the image that are less than the entire area of the image. In various implementations, the edit operation applied by the selective editing tool can be a last edit operation applied to the image prior to block 210, or can be a different edit operation applied previously to the image. Some implementations can apply one or more edit operations in block 210 that were omitted from the image in block 208. In some implementations, one or more edit operations can be applied in block 210 that are different than one or more edit operations applied in block 204 and/or omitted in block 208. For example, a default edit operation can be applied in block 210, and/or the modifications in block 210 can be made by additional or different edit operations not previously applied.

The selective editing tool can be selected and/or used by the user in any of various ways or implementations. In some examples, user input can identify one or more particular areas (e.g., groups or regions of pixels) of the displayed image with a finger (e.g., on a touchscreen that displays the image), cursor, voice command specifying the areas, or other commands, and those areas are local areas modified by the edit operation. For example, the user input can point to the one or more local areas via use of the selective editing tool, e.g., using a finger on a touchscreen or a displayed cursor. The application of the edit operation can also be based on control settings of the selective editing tool, such as brush size or width, radius or size of a control point area, opacity of an applied change to color, etc.

In some implementations, the method (or a different process or system) can automatically (e.g., without intervention by a person) suggest one or more of the local areas that can be modified. For example, one or more image recognition techniques can be used to detect image features depicted in the image, e.g., faces, facial features (teeth, eyes, etc.), persons, objects, landscape features (sky, trees, grass, etc.), landmarks, or other features. In some examples, facial recognition techniques can look for facial landmarks (eyes, nose, etc.) and other facial characteristics to detect faces. In additional examples, some recognition techniques can look for particular colors, textures, etc. to detect particular types of features, and/or can compare portions of the image to known image samples or patterns. In some implementations, one or more detected or recognized image features can be highlighted in the display of the image editing program, e.g., features outlined, colored, or otherwise displayed to indicate a suggested feature that can be a local area. In some implementations, user input can select one or more of the suggested image features as local areas to cause the modification (e.g., edit operation) to be applied to the selected image features. In some implementations, different portions of recognized image features can be suggested as individual local areas. For example, if a person is recognized, the face, torso, arms, hair, and legs can be individually suggested as different local areas, or the teeth and eyes of a face can be suggested as individual local areas.

In some implementations, the method can provide a display the image, e.g., in the user interface of the image editing program by a display device, to allow the user to indicate local areas of the image to modify with the edit operation. For example, the system can update the display after each modification to the image, or during a modification to the image (e.g., as the user is moving a pointer across the image).

This modification of block 210 can be different than the modification to the image applied in block 204 which was omitted from the image in block 208. For example, the modification of block 210 can be applied to one or more selected local areas determined based on use of the selective editing tool, instead of being applied to the image without use of the selective editing tool. For example, application without use of the selective editing tool may have been based on predetermined instructions as described for block 204 (e.g., where the predetermined instructions caused the edit operation to be applied to the entire image or to predetermined portions of the image in block 204). The edit operation may process pixels of the indicated local areas in block 210 similarly as it processed the pixels in block 204, but different pixels of the image are typically processed in block 210 as compared to block 204.

In some implementations, method 200 can be performed additional times or iterated for additional edit operations. In some examples, a user can select a selective editing tool in block 206 after any edit operation is applied. Based upon the user selection, modifications to the image based on that edit operation can be omitted in block 208. Further, one or more local areas of the image can be modified based on that edit operation in block 210.

Some implementations of the method allow an edit operation of any type or complexity to be applied to an image using a selective editing tool of an image editing program. The method allows the edit operation to be applied to the image without requiring the user to perform complex tasks such as creating and using mask layers, channels, or using other complex editing workflows. Therefore, less effort and resources are needed for a user to effectively edit an image.

Figure 3:
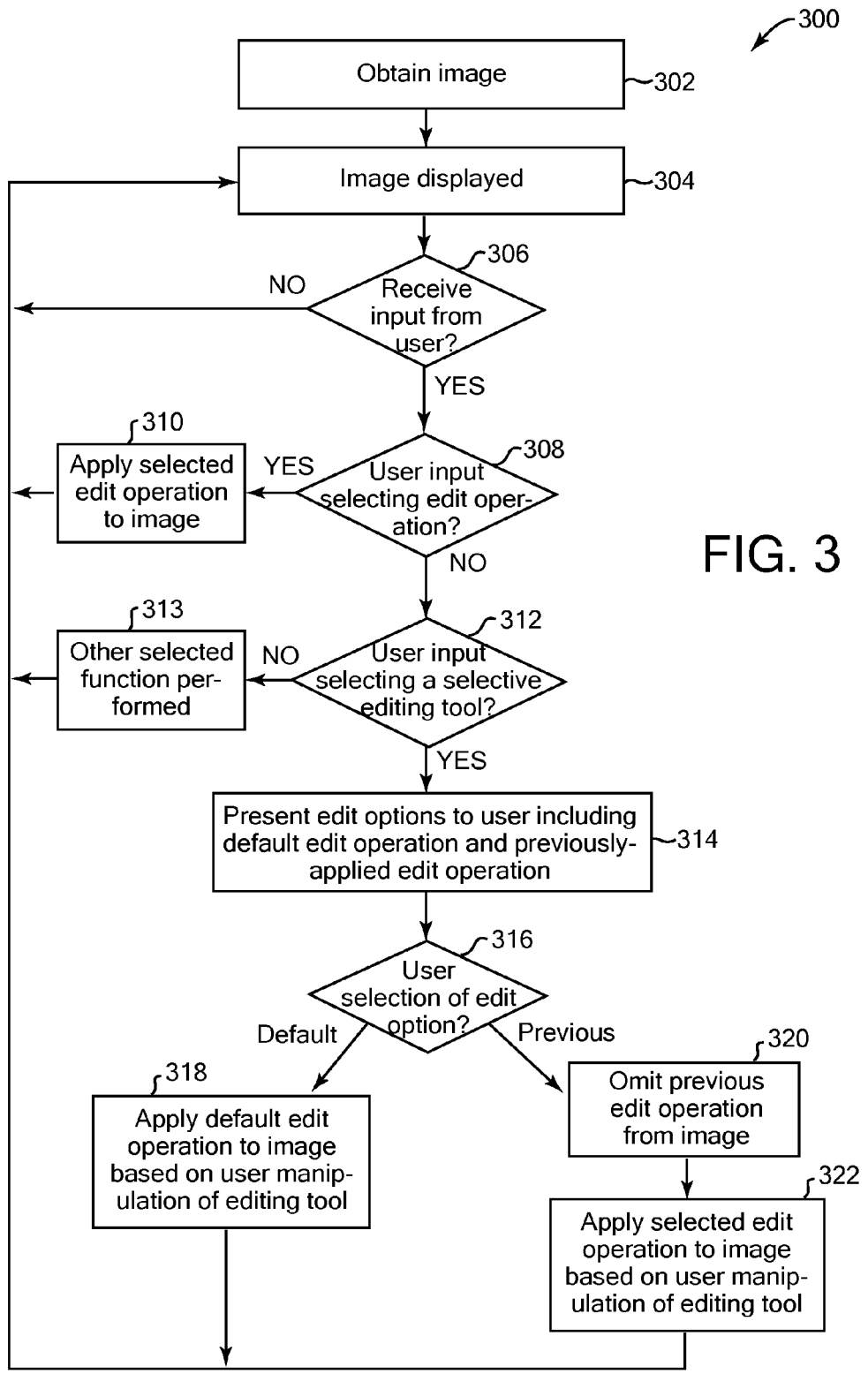
FIG. 3 is a flow diagram illustrating another example method to edit images using selective editing tools, according to some implementations.

FIG. 3 is a flow diagram illustrating an example method 300 to edit images with selective editing tools, according to some implementations. Method 300 can be similarly implemented by a system that is or includes, for example, a server and/or client device, and can be similarly initiated and performed, as described above for method 200.

In block 302, the method obtains an image similarly as described above for block 202 of FIG. 2. In block 304, the method causes display of the image For example, the image can be displayed by a display device of or in communication with the implementing system. In some examples, the image is provided for display by an image editing program running on the system, where the image editing program can include a user interface (e.g., editing interface) that presents image editing options and editing settings for the user. For example, the user interface can include a graphical user interface, command line interface, etc. Some examples of user interfaces using one or more features herein are described below with reference to FIGS. 4-8.

In block 306, the method checks whether input has been received from a user. For example, the input can be received in the user interface of the image editing program, e.g., a selection by the user of an icon, command, menu item, graphical button, or other control of the interface. In various implementations, the input from the user can be provided as or derived from touch input on a touchscreen of a device used by the user. The user input can be input provided by the user using a device, such as a press or activation of a physical button on a hardware device (mouse, trackball device, etc.) while a user-controlled cursor is positioned over a desired icon, button, etc. displayed in the user interface. In some implementations, the user input can take other forms, such as a voice or sound command input to a microphone of the system to select a function of the image editing program (e.g., recognized via voice recognition or sound command recognition techniques), a visual command input to a camera or other visual sensor of the system and recognized by the system as a command (e.g., an eye-motion or eye-tracking command, finger or hand gesture, etc.), or a motion command detected by motion sensors such as accelerometers and/or gyroscopes (e.g., moving or orienting a portable device in a predetermined manner to be recognized as a command by the system implementing method 300). Some implementations can use gesture input to provide various commands, e.g., different predefined paths or patterns of motion of a cursor, finger, device, etc. associated with different commands.

If no user input has been received in block 306, then the method returns to block 304 to continue displaying the image (and performing other functions as appropriate in the particular implementation). If user input has been received, then in block 308 the method checks if the user input is indicative of selection of an edit operation to be performed on the image. In some implementations, in block 308 the method can check for user selections that do not involve selection of a selective editing tool and ignore selections involving a selective editing tool. For example, in some cases block 308 can check for whether the user has selected an edit operation such as a filter (or set of filters) that is applied to one or more pixels of the image, such as a blur, contrast, saturation, brightness, and/or color change over the entire area of the image or portion(s) of the entire area of the image. For example, the edit operation can be a filter or set of filters that changes characteristics of the image according to one or more predetermined parameters of the filters. In some cases block 308 can check for an edit operation that is to affect only one or more portions or pixels of the image and not all the pixels of the image. For example, a filter applying a change to green color pixels may affect only particular pixels of the image that have a green color as indicated by particular color value range of pixel color values affected by the filter. In some implementations, block 308 can check for (e.g., not ignore) user selections that include selection of a selective editing tool, which can modify local areas of the image via use of the selective editing tool.

If the user input is indicative of selection of an edit operation as checked in block 308, then in block 310 the method applies the selected edit operation to the image to provide a modification to one or more pixel values of the image. For example, similarly as described above with reference to block 204, the edit operation can be performed to apply to the entire image in some cases or implementations. The edit operation can change pixel values to modify the blurriness/clarity, saturation, brightness, particular hue, and/or other visual pixel characteristics over the entire image. In some cases or implementations, the edit operation can be applied to all the pixels of the entire image so as to process all the pixels, but may only affect some of pixels of the image that satisfy one or more conditions of the edit operation. For example, the edit operation may affect only pixels having a particular color or brightness within a particular range or satisfying a threshold that is specified by the edit operation, or pixels being within a predetermined distance range of a predetermined location in the image as specified by the edit operation, etc. In some cases or implementations, the edit operation may be applied to only a subset or portion of the pixels of the image, e.g., based on predetermined instructions as described above with reference to block 204. The method then can return to block 304 to display the image. For example, the modified (updated) image can be displayed in the user interface of the image editing program or by a different application program, similarly a described for FIG. 2.

If the user input has not selected an edit operation as checked in block 308 (or if the user input has selected an edit operation and also includes or has additionally made one or more other selections), then in block 312 the method checks whether the user input has selected a selective editing tool in the image editing program. In some implementations, the checks in blocks 308 and 312 can be performed simultaneously or in a different sequence. For example, the user input can be touch input on a touchscreen. Alternatively, the user input can be a signal caused by the click of a physical button on a device by the user in conjunction with a selection pointer (e.g. user-controlled displayed cursor) pointing to a selective editing tool icon, button, or other graphical object displayed on the screen. The user input can alternatively be a voice or sound command, visual command, motion command, or other type of user input similarly as described above for block 306.

The selective editing tool can be any editing tool or function, e.g., provided in the image editing program, that allows a user to selectively apply an edit operation to particular pixels or areas of an image. Using the tool, a user can direct the application of an edit operation (e.g., a filter) on a desired portion of the image by selecting particular pixels of the image in that desired portion. For example, user input from the user can select desired pixels by causing pointing or clicking on a particular selected object or region within an image such that all pixels in the object are selected. In other cases, a user can drag or otherwise move a finger (or other physical object) or cursor over displayed pixels of the image to select those pixels. In other cases, the user can draw or drag displayed points to create a selection shape (e.g., rectangular box, circle, ellipse, freeform shape, etc.) to surround pixels of the image that are selected. In other cases, the user can drag a gradient cursor to affect portions of the image, and/or can perform some other selection action using the tool. For example, user input causing such selections can be derived from user touchscreen contact, user manipulation of a physical device, or various types of user commands as described for block 306.

In some implementations, the selective editing tool can be provided as a selective editing mode of the image editing program. For example, the selective editing mode can be a mode of the image editing program that is different from one or more other modes of the program in which no selective editing tool is selected. For example, other modes can include a mode in which an edit operation is applied to the entire area of the image, an image selection mode allowing selection of portions of the image (without application of an edit operation), a mode in which text can be added to the image, etc. A selective editing mode can be entered by a user providing a command, e.g., selecting a displayed icon, button, menu item, text link, or other graphical object displayed in the image editing program's user interface or providing a different type of command. In some implementations, the selective editing mode can be selected based on any of the types of user input, commands, and/or interface controls described above. In some implementations, an indication that the selective editing mode is active can be displayed in a user interface, e.g., a particular icon, background color to the interface, etc. In some implementations, while the selective editing mode is active in the image editing program, a selection of particular editing tools available in the image editing program can be considered a selection of an equivalent selective editing tool providing the selective application of an editing operation as described herein. For example, a standard editing tool that only selects a portion of the image while not in selective editing mode can become a selective editing tool that also applies an edit operation to selected areas as described herein while the editing program is in the selective editing mode.

If the user has not selected the selected editing tool in block 312, the method performs (or instructs another appropriate process to perform) the function selected by the user in block 313, if appropriate (e.g., if the user has selected a tool or function of the image editing program), and the process can return to block 304. If the user input has selected a selective editing tool as determined in block 312, then in block 314, the method presents one or more edit options to the user for using the selected selective editing tool. For example, in some implementations, the edit options can include an option that is a tool option and/or mode option to select for use one or more default edit operations associated with the selective editing tool. In some implementations, the edit options can include a tool option or mode option to apply a previously-applied edit operation (e.g., an edit operation applied in block 310) using the selected selective editing tool.

In one example, a default edit operation associated with a selective editing tool that is a brush tool can be a modification of colors. In this example, color values of pixels in images that are "brushed" over with a user-controlled cursor of the tool to can be changed to a default color value or a set of color values designated by the user (e.g., via parameter selection, previously-stored user preferences, etc.). In another example, a default edit operation of the brush tool can be increasing the brightness of brushed-over pixels by a predetermined amount or to a predetermined brightness value or based on a predetermined brightness parameter for the brightness edit operation. In various other examples, a default edit operation of a selective editing tool such as a gradient operation tool can be, for example, a predetermined rate of color change for a gradient selected between two selected or predetermined colors, and having predetermined brightness values. The default operation of a selective editing tool such as a control point tool can be to add a control point to the image having a set of predetermined parameters such as a particular radius, diameter, or other shape of modification relative to the control point. The control point can have one or more predetermined edit operations associated with the control point such as brightness, color, saturation, etc. to apply to the particular shape of modification determined by the control point. In some examples, the default operation of a smart selection tool can be similar to a brush tool. In some implementations, a selected default option can select multiple default edit operations to be applied with the selective editing tool.

In some implementations, block 314 can provide an option to use a previously-applied edit operation with selective editing tool. The previously-applied edit operation was previously applied to the image in the image editing program (or other program, e.g., as indicated by image metadata). In some implementations, this option can present the last edit operation applied to the image prior to the presenting of edit operations in block 314, e.g., the last edit operation applied to the image based on user instruction or other input. For example, the last edit operation applied in block 310 can be presented. In some implementations, this presented edit operation can be the last edit operation that was applied and did not include the use of a selective editing tool allowing local changes as directed by the user (e.g., applied to the entire image, applied by examining the entire image for conditions to allow application of the edit operation, or applied to the image or a portion thereof based on predetermined instructions as described above). In some implementations, the presented edit operation can be the previous (last) operation applied to the image regardless of the type or application of edit operation, e.g., whether that previous edit operation was applied with or without a selective tool, was applied to a portion of the image using a selective editing tool, etc. In some implementations, the presented edit operation can be an operation that affected one or more pixels or pixel values of the image (e.g., modified, added, or removed one or more pixels). In one example, if the last edit operation in the image editing program was a selection of a different tool than a currently-selected tool (without using that previous tool to adjust pixels), the method can omit that last edit operation from consideration. In such an example, the method can provide a previously-applied edit operation that changed one or more pixels of the image prior to that selection.

In some implementations, block 314 can provide one or more options, where each such option selects multiple previously-applied edit operations to use with the selective editing tool. For example, an option can be displayed that includes multiple listed edit operations. If user input selects the option, the multiple edit operations are selected for use with the selective editing tool. In various implementations, the multiple edit operations can be selected for application with the selective editing tool in a displayed order, or a user can reorder the edit operations to a desired order of application. In some implementations, user input can select multiple options in the displayed menu for use with the selective editing tool.

In some implementations, block 314 can also or alternatively provide one or more edit options allowing user input to select one or more previously-applied edit operations to omit and/or select one or more particular edit operations to apply to the image. For example, selected previously-applied edit operations can be omitted from the image similarly as described below for block 320. Selected edit operations to apply can be applied similarly as in block 322, for example.

In block 316, the method checks whether the user has selected one of the selective editing tool options presented in block 314.

If the user has selected a default edit operation, e.g., by selecting a default option or by not selecting any option, then the method can continue to block 318, in which the method applies the selected default edit operation(s) to local areas of the image based on user manipulation of the selective editing tool (e.g., while the selective editing tool is active). The user manipulation can include moving a selection pointer (e.g., cursor) over pixels of the image. For example, user input can direct a selection pointer to move over pixels of the image to change the moved-over pixels based on the default edit operation, such as changing color, brightness, etc. of those pixels. For example, in a touchscreen implementation, the selection pointer can be the user's finger on the touchscreen, where the user can move his or her finger on the touchscreen over pixels of the image displayed on that touchscreen, to cause the moved-over pixels to be changed according to the default edit operation. In other implementations, a selection pointer can be a displayed pointer or cursor. In these implementations, the user can use an input device to move or manipulate the cursor over particular pixels of the image to change those pixels according to the default edit operation (e.g., while holding a device button, after selecting a device button, or after or during providing some other command in some implementations). Some implementations can direct a selection pointer, or can otherwise select particular image areas, based on other commands, e.g., voice commands, eye-tracking commands, motion commands, etc.

In some implementations, the method can continue to perform block 318 while the selective editing tool is active, and then can return to block 304 to continue to display the (now modified) image. In some implementations, the method can provide updates to the display of the image as it is being selectively and incrementally modified with the default operation and the selective editing tool. In some implementations, before applying the default edit operation to local areas of the image, the method can restore the image to a state prior to a previously-made modification, e.g., prior to the last modification made to the image, similarly as in block 320 described below.

If the method determines in block 316 that the user has selected the option to apply a previously-applied edit operation (or multiple previously-applied edit operations), then the method continues to block 320 in which the method omits from the image the modification caused by application of the previously-applied edit operation(s) to the image, e.g., restores the image to a state prior to the modification. For example, the method can omit the modification to pixel values in the image by changing pixel values in the stored image, and/or reverting to a stored version of the image having a state prior to the modification. If the image is being displayed, the method can also update the corresponding visual display of the image such that the image is displayed in its prior state. For example, if the previously-applied edit operation changed the color or brightness of the entire image, then block 320 omits that change in color or brightness to revert the image back to its state before the application of that edit operation. In another example, if the previously-applied edit operation changed pixel values of only some of the pixels of the image, then block 320 omits those changes to revert the image back to its prior state. In some implementations, an image editing program (or other program) can maintain a list or queue of previously-applied edit operations, and the method can change the state of the image to a state before the previous (e.g., last performed) edit operation and delete that edit operation from the list. In some implementations, the method can store a version of the image after each edit operation (e.g., filter) is applied, and can revert the image to an appropriate one of the earlier versions of the image. In some implementations, the previously-applied edit operation may have been applied with a selective editing tool, and if so, it is not removed in block 320. For example, such an image modification may indicate greater user involvement and probable user desire to retain that modification. Some implementations can remove a previously-applied edit operation even if it was applied with a selective editing tool. Some implementations can remove a previously-applied edit operation that was applied with a selective editing tool only if particular conditions are present, e.g., a threshold percentage or greater number of image pixels (relative to the total number of image pixels) were changed with the tool, or a (different) threshold percentage or less of pixels were changed with the tool, etc.

In block 322, the method applies the previously-applied edit operation(s) to one or more local areas of the image based on user manipulation of the selective editing tool. For example, the method can apply the previously-applied edit operation(s) while the selective editing tool is active. In some implementations, the user manipulation can include moving a selection pointer over pixels of the image. For example, in a touchscreen implementation, the user can move his or her finger as the selection pointer over the touchscreen to apply the edit operation to image pixels that the user's finger is moved over as displayed on the touchscreen. In another implementation, the user can cause a displayed tool cursor to move as the selection pointer over pixels of the image based on input from an input device, and the edit operation can be selectively applied to the moved-over pixels based on user input (e.g., holding down or toggling a physical button of the input device). Other types of user input can be used, similarly as described above for block 318. In some implementations, the method can continue to perform block 322 while the selective editing tool is active, and then the method can return to block 304 to display the image. In some implementations, the method can provide updates to the display of the image during its selective modification by the edit operation(s) and the selective editing tool.

In some implementations, after using the selective editing tool with an edit operation (such as a default or previously-applied edit operation), the user can instruct the method to again display the edit options in block 314. The user can select a different edit option presented by block 314 and use the selective editing tool with the newly-selected edit option.

The selection of the option for the previously-applied edit operation by the user can allow the user to selectively apply that edit operation to an image with a simple and effective user interface feature. In one example, the user can plan the use of the selective edit operation by first applying the edit operation to the entire image. The modified image can also act as a visual preview for how the later selective application of that edit operation will affect the image, since the effects of the edit operation are displayed in the image. Then the user can select the selective editing tool and the option for the previously-applied edit operation, which causes the modification caused by the previously-applied edit operation to be removed from the image to present the user with the ability to selectively apply that modification as desired on the "pristine" image that has been unaffected by that edit operation. Thus, for example, particular selected regions of the image can be easily modified by the user with a complex filter or preset using a simple interface such as a touchscreen interface, without the user having to learn or know about complex operations or structures used in image editing programs such as masks, alpha channels, and layers.

In some implementations, additional options can be presented to the user in block 314. For example, one or more additional previously-applied edit operations that were performed prior to the last edit operation (or one or more other edit operations) can be presented for selection. In some implementations, if the user selects such an earlier edit operation, then just the modification from that earlier edit operation can be removed from the image in block 320. That earlier edit operation can then be applied to the image based on user manipulation of the selective editing tool in block 322. For example, in some implementations this can be implemented by omitting modifications from the image due to all of the subsequent edit operations applied after the selected edit operation and omitting the selected edit operation from the image, and then re-applying the subsequent edit operations to the image without re-applying the selected edit operation. The user can then apply the selected edit operation using the selective editing tool. In some implementations, the modifications from the selected edit operation and from all the edit operations were applied after the selected earlier edit operation can be omitted from the image and are not reapplied to the image. In these implementations, the user can then apply the selected edit operation using the selecting editing tool (and/or can be provided with options to apply one or more of the other omitted edit operations using the selective editing tool). For example, this allows the user to display the image in an earlier state prior to the application of multiple previously-applied edit operations, and then apply one or more earlier edit operations to the image selectively.

In some implementations, one or more of the described selections, editing tools, modes, edit operations, and/or parameters can be determined based on user input provided by a user, and/or can be inferred based on one or more other factors related to the user, image editing program, image, etc. For example, the user may have previously input user preferences indicating user-preferred parameters, edit operations and tools, selective editing tools, modes, or commands, and these user preferences can be stored and accessed by the methods 200 and 300 to automatically set particular selections of method 200 and 300. In some examples, user data can be used to determine such selections. Such user data can include a history of user selections in prior edits to other images, e.g., in the same image editing program and/or other image editing programs. For example, the history can include or provide the number of times a particular selective editing tool was used and for which particular edit operations, the percentage of times of such use, etc., as compared to stored thresholds, etc. The history of user selections can indicate user preferences for types of image modifications made to other images, e.g., based on image content (e.g., recognized image features or objects in images determined by image recognition techniques, etc.) or based on other image characteristics (size or resolution, shared status with other users, time/date of capture, the storage device or service where the images are stored, etc.). Such user data can include prior messages, comments, ratings, or other social data indicating user preferences for particular images, image content, and types of edit operations and modifications for images. Such user data may be accessed by methods 200 and 300 from social networking services or other online network services used by the user, e.g., if permission for such access is provided by the user. In some implementations, user preferences and/or history data can be stored and maintained by an image editing program, e.g., running on a client device.

Various blocks and operations of methods 200 and 300 can be performed in a different order than shown and/or at least partially simultaneously, where appropriate. For example, some implementations can perform blocks of the methods at various times and/or based on events not related to a user editing an image. In some implementations, blocks or operations of methods 200 and 300 can occur multiple times, in a different order, and/or at different times in the methods. In some implementations, the methods 200 and/or 300 can be implemented, for example, on a server system 102 as shown in FIG. 1. In some implementations, one or more client devices can perform one or more blocks instead of or in addition to a server system performing those blocks.

Figure 4:
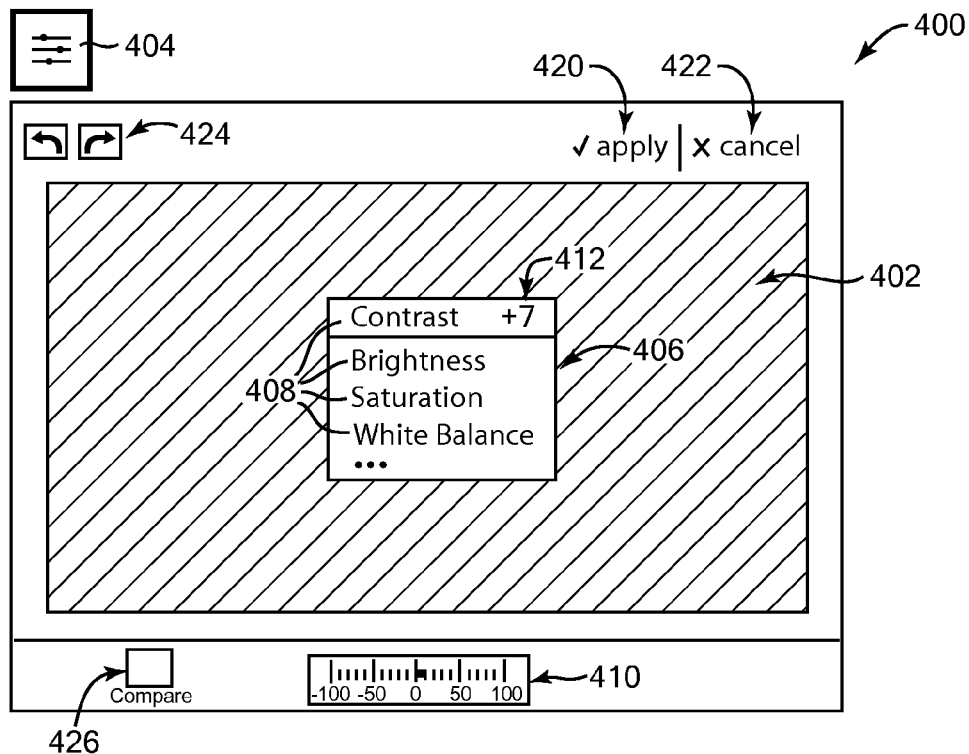
FIGS. 4-7 are diagrammatic illustrations of example user interfaces using one or more described features.

FIG. 4 is a diagrammatic illustration of an example of a user interface 400 of an image editing program that can use one or more features described herein. User interface 400 can be displayed by a display device of a system implementing method 200 or 300, in some examples.

User interface 400 can be displayed by an image editing program that provides image editing functions to a user. For example, the user can open an image 402 (indicated by hatch lines in FIG. 4) that is displayed by the image editing program in the user interface. Alternatively, image 402 can be opened in interface 400 by a program. User interface 400 also includes various controls which can be manipulated by the user. For example, the user can select and/or manipulate a control by contacting a finger or other object on a touchscreen, or using a pointing device that controls a cursor displayed in user interface 400 which can be moved over the desired control to allow selection and/or manipulation of the control.

User interface 400 allows the user to select various functions to manipulate the characteristics of the image. In this example, the image editing program can implement a modular image editing system that can be used in some implementations, in which a user can apply a series of edit operations to an image with generally no limitation as to the sequence in which the user may choose to apply the edit operations. Additionally, the user can apply the series of edit operations with generally no differentiation as to the type of edit operations with regard to when an edit operation can be applied. In some implementations, edit operations can be organized into different editing modules (e.g., filter modules), where each editing module can include one or more edit operations that may be considered similar or related to each other in complexity, number of parameters, effect on the image, etc. A modular image editing system can provide editing modules that include edit operations of the editing program and which can be applied at any time. For example, in some implementations such edit operations can be applied to an image regardless of a state or status in the image or image editing program that previously-applied edit operations have created, e.g., applied with no requirements that other operations or structures (e.g., image masks) be created and applied before the edit operation can be applied to the image.

In some implementations, the user need not be required to understand any particular hierarchy of edit operations that may be required to use edit operations in other types of editing programs. In some implementations, features described herein can allow the image edit operations that have been applied to the image to be displayed in a linear sequence, e.g., indicated by a display of a linear sequence of the modules that include those edit operations, without having to portray a complex hierarchy of edit operations, other operations, or parameters to the user, an example of which is shown below with respect to FIG. 9.

In the present example interface of FIG. 4, an icon can be displayed. The icon can represent the current edit operation, or the editing module that includes the current edit operation, that is active, e.g., has been selected to edit the image. For example, icon 404 can be displayed to indicate that the currently-active editing module is a basic filter module provided in the image editing program. In this example, the basic filter module presents the user with the ability to apply any of multiple basic filters to the image and to adjust parameters for those filters. The user can adjust the parameters of one or more of the basic filters and preview the results on the image 402. If the user wants to keep the modifications, the user can instruct the editing program to apply the filters of the module to the image to keep the modified image. In this example, this application of multiple filters can be considered a single "edit operation," e.g., where the modifications are applied at approximately the same time to the image based on a user's input (e.g., selecting an "apply" or "accept" button). In some implementations, each of the filters in module 404 can be considered a single edit operation, and/or provided in its own module.

Interface 400 includes an example menu 406 which can present one or more of the filters included in the currently-active basic filter module. A user can select one of the presented filters 408. Further, the user can select or change the parameters of the selected filter. For example, the user can select a filter and then use a slider control 410 to increase or decrease a magnitude parameter for the selected filter. In the example shown, a user has selected a contrast filter to cause a modification to the contrast of image 402. After the filter is selected, an associated slider control 410 is displayed. The user can provide input to move the slider left to provide a negative parameter to the contrast filter (e.g., reducing contrast in the image with a negative contrast adjustment) and move the slider right to provide a positive parameter to the contrast filter (e.g., increasing contrast in the image with a positive contrast adjustment). The current magnitude, value, or level of the adjusted parameter can be displayed as a parameter value 412 next to the filter menu option, in some implementations. In some implementations, the level of the adjusted parameter can be described in other ways, e.g., using a color, using words (e.g. High, Medium, Low), using a scale, or the like. These modifications to the selected filter can be immediately applied as a preview to displayed image 402 in interface 400 to allow the user to view the results of different parameter adjustments. Other filters 408 in menu 406 can be similarly selected and adjusted by the user.

User interface 400 can also include other controls which can be selected by the user. For example, the apply control 420, when selected by a user, causes the previewed modifications made by the user manipulating the filters in the menu 406 to be applied to image 402, e.g., causing a new image to be stored in an accessible storage device (and, in some implementations, preserving an storage image 402 in the state before the modifications were applied), or writing over the previous version of the image. A cancel control 422, when selected by a user, causes modifications that have been set by the user manipulating the filters in menu 406 to be removed, e.g., any modified parameters can be reset to default or prior values and the preview of the modifications made to image 402 is removed, such that image 402 is displayed in its state prior to user modifications using the filters of menu 406. Undo and redo controls 424 can be used to affect individual parameter adjustments of filters in menu 406 made by the user. For example, the undo control can allow a user to select that the latest parameter adjustment be removed from the filter and from the displayed preview of the image, thus returning the image preview to its previous state before that parameter adjustment. The redo control, when selected by a user, causes the system to re-implement the next parameter modification that was made by the user, e.g., if the user has previously selected the undo control. A compare control 426 can be included in some implementations of interface 400 that, while selected, causes image 402 to revert to its former displayed state before the filters of the current module were applied, e.g., temporarily remove the preview function of image 402 to allow the user to view and compare the effect of changes made using filters in menu 406.

Figure 5:
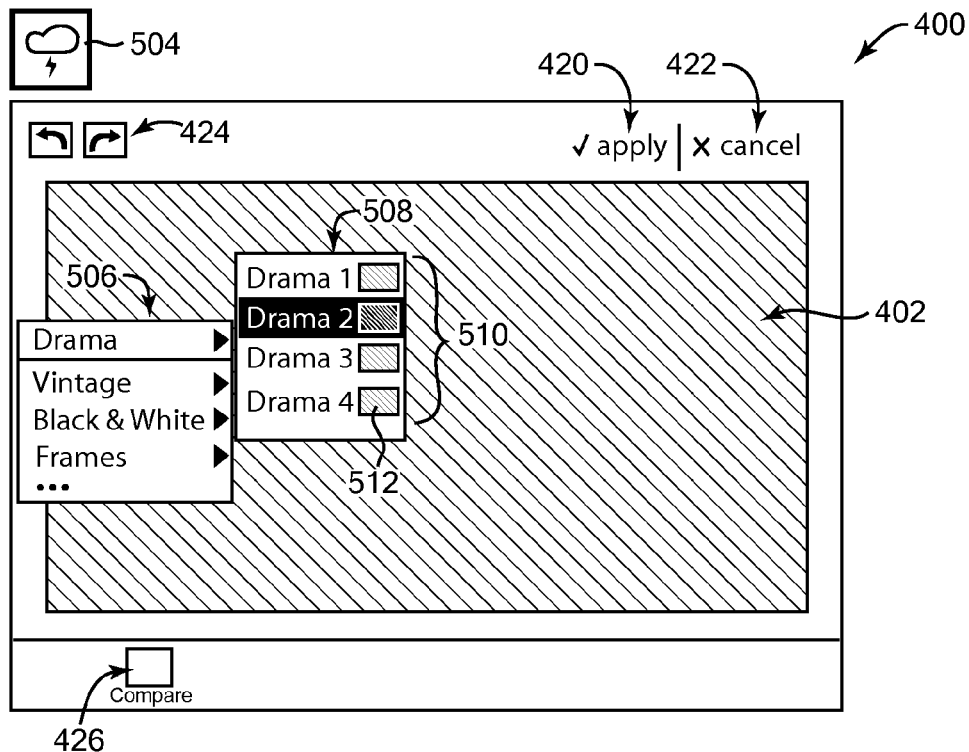

FIG. 5 is a diagrammatic illustration of another example of user interface 400 of FIG. 4 using one or more features described herein to edit image 402. In this example, the user has selected to make a different editing module active in the editing interface to allow access by the user to edit operations and other functions of that module. For example, the module of FIG. 5 can be a "style" or "special effects" filter module that presents one or more different filters affecting a style or look of the image. A different icon 504 can be displayed in the interface to indicate that the special effects filter module is active and that the interface is current providing editing (or other) functions for a different module than the basic filter module of FIG. 4. Similarly numbered items across FIGS. 4-7 are equivalent or the same, and are not described again for brevity.

In this example, a menu 506 is displayed in user interface 400. Menu 506 shows some available special effect filters that can be selected in the active special effects module. In this example module, the provided filters can include special effects such as "drama" (e.g., providing a large amount of contrast and changes to other pixel characteristics to cause certain edges or colors to stand out in the image), "vintage" (e.g., adding an aged look to the image, such as brownish tint, scratches, faded colors, etc.), black and white (e.g., desaturating and/or otherwise removing color from the image in particular ways), frames (e.g., adding an outline or frame object to the border or perimeter area of the image), etc. Any of the provided filter options can also have additional options, including additional selections to customize the effect of that filter. For example, the user has selected the drama filter in the menu 506 which causes a sub-menu 508 to be displayed. Several selection options 510 in sub-menu 508 for the drama filter allow the user to select a particular style, color, and/or other aspect of the drama filter. In some implementations, a preview image 512 can be displayed for each selection to indicate the visual effect of the associated selection on image 402 or a portion of image 402.

For example, if the user selects the "Drama 2" filter as shown in FIG. 5, that drama filter is applied to the displayed image 402 as a preview to the user. In this example, the modification and visual effect of the applied filter is shown as a different hatch pattern on image 402 of FIG. 5 than in image 402 of FIG. 4. In this example, the user can select the apply control 420 to retain the modification at the selected settings. In various examples, the user can then continue selecting one or more special effect filters using menu 506 or sub-menu 508, can undo the applied filter using a control 424, can exit the module and go to a different module, etc. Alternatively, the user can select the cancel control 422, e.g., to remove the selected Drama 2 effect from the display of image 402 in interface 400 of FIG. 5. In some implementations, one or more of the filters in menu 506 can be associated with one or more parameters that can be adjusted by the user, e.g., similar to parameter value 412 of the contrast filter described above for FIG. 4.

Figure 6:
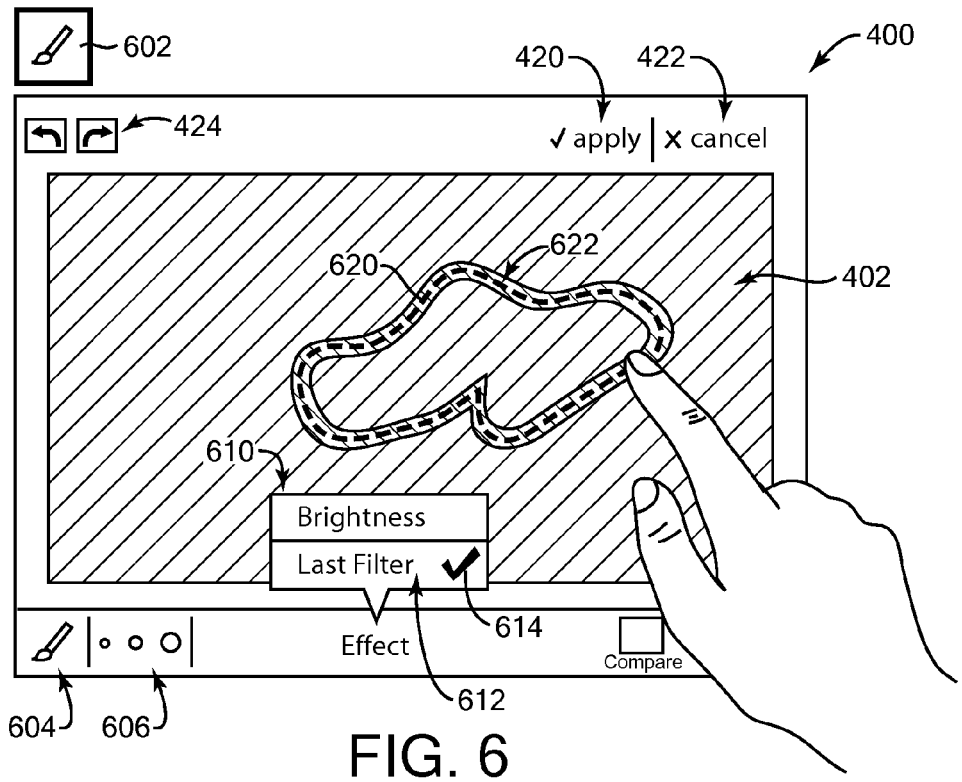

FIG. 6 is a diagrammatic illustration of another example of user interface 400 of FIG. 4 facilitating the use of one or more features described herein to edit image 402. In this example, the user has selected to use a different editing module of the image editing program. For example, this module can be a brush tool module that can provide a selective editing tool for the user to edit particular selected areas or pixels of the image according to features described herein. A different icon 602 can be displayed in the interface to indicate that the brush tool module is currently active in user interface 400 and that other modules are not active.

In this example, the brush tool module can provide a tool icon 604, which the user can select to cause user interface 400 and the image editing program to go into a brush tool mode (e.g., icon 604 can indicate a particular tool or filter included within an editing module indicated by icon 602). While the interface is in the brush tool mode, the user can point to a location on the image to change the pixel(s) at the location based on the edit operation being applied by the brush tool. Some implementations can provide a brush size or width control 606 which allows the user to select a desired size of the application area in the image which will be changed. For example, a small brush size can be made to only affect a small number of pixels surrounding the point on the image selected using the brush tool, while a large brush size can be made to affect a larger number of pixels surrounding the selected point.

The interface also can present a menu 610 to allow the user to select the particular edit operation (e.g., filter) that will be applied by the brush tool. For example, in some implementations the menu 610 can be displayed after the user selects the brush tool for use, such as by selecting icon 604. In other example implementations, the menu 610 can be displayed automatically upon entering the brush tool mode, or displayed after the user selects an option or control associated with the menu 610.

One of the options presented in the menu 610 can be a default edit operation. In the example of FIG. 6, the default edit operation can be a brightness filter that changes the brightness of pixels selected by the brush tool. The brightness filter can have one or more default parameters indicating the level of brightness for the selected pixels. For example, the default parameters may indicate a change in level of brightness for the selected pixels after application of the filter as a numerical value, as a percentage, etc. In other implementations, the default edit operation can be any other type of edit operations. For example, the default edit operation can be a contrast filter as described above, a color edit operation (changing the pixels to a color that can be selected by the user in one or more other menus, in some implementations), a blur filter, etc. In some implementations, multiple options can be presented in the menu 610 to allow user selection of any of multiple different default edit operations, or a combination of multiple default edit operations.

Also displayed in the menu 610 is a selective edit option 612 (shown as "last filter" in the example of FIG. 6). This option, in response to being selected by the user, causes a previously-applied edit operation applied to the image to be used as the edit operation selected for application by the brush tool. For example, this can be the last edit operation that was applied to image 402 after the user selected the "apply" control 420 in the example interface 400 of a previously-used module, e.g., the Drama 2 filter of FIG. 5. In some implementations, edit option 612 can present the last edit operation applied using a module different than the current module (e.g., the current module being the brush tool module in this example). In some implementations, the selective edit option 612 can present any previously-applied edit operation, including one applied previously in the current module, such as a change to the image applied using the brush tool. In some implementations, a list of multiple such previously-applied edit operations can be displayed for selection by the user.

If the user selects the selective edit option 612, the modification and visual effect of the last edit operation are removed from the image 402. In some implementations, this has the same effect as if the user had selected the cancel control 422 while the module of the last edit operation is still active, or selecting the undo control 424 in some implementations. In the example of FIG. 6, the user has selected the selective last edit option 612, causing an indicator 614 to be displayed to indicate the selection, and also omitting the modification and displayed visual effect of the last edit operation from the image 402. In one example, if the last edit operation was the drama filter applied as described above with respect to FIG. 5, then the image 402 reverts to the state before the drama filter was applied, e.g., reverts to the image 402 as shown in FIG. 4 after the basic filter edit operation (including contrast as described above) was applied. This reversion to the earlier stage of the image is indicated with the same hatch pattern on image 402 in FIG. 6 as in FIG. 4.

The user then starts using the brush tool by selecting parts of the image while the brush tool is active. For example, the user slides a finger across a touchscreen in a desired direction or path. An example of the user's traced path 620 on the image 402 is shown in FIG. 6 as a dashed line. As the user traces the path, a stroke 622 based on the selected brush tool size 606 is applied to the image 402 centered on the path 620. Since the user has selected the last edit operation option 612, the last edit operation (e.g. drama 2) is applied to the stroked local areas of the image. In this example, the last edit operation modifies all of the stroked area according to the drama edit operation as indicated by the modified image areas having same hatch pattern within the stroke 622 in FIG. 6 as in the image 402 in FIG. 5. In this example, the stroke 622 can have a size or width based on a control such as brush size control 606. In the described implementation, the user can select the apply control 420 to cause the modification from the stroke 622 edit operation to be saved to the image. Alternatively, the user can select the cancel control 422 or undo control 424 if the user does not want to keep the modification from the stroke 622 edit operation. If the user had selected the brightness option in the menu 610, the stroke 622 can apply a brightness filter modification to the stroked area of the image.

Figure 7:
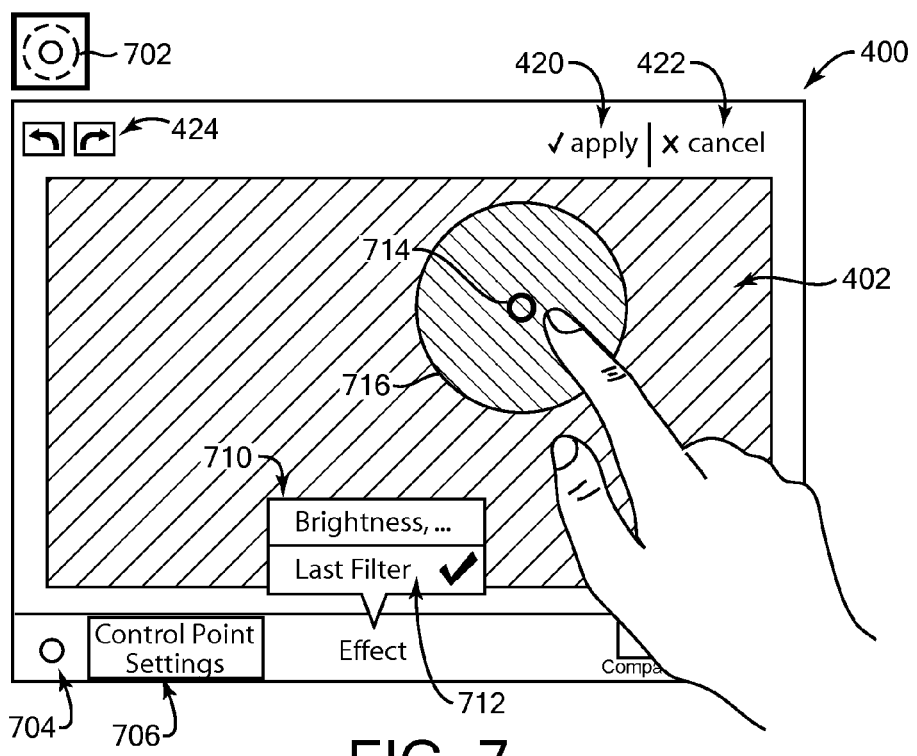

FIG. 7 is a diagrammatic illustration of another example of using interface 400 to perform edit functions described herein to edit the image 402. In this example, after applying the edit operation in FIG. 5, the user has selected to use a control point module to access editing functions of that module. An icon 702 can be displayed in the interface to indicate that the control point module is currently active in the interface 400.

In this example, the image editing program can display a control point tool icon 704 to indicate that a control point tool is active in the interface 400 and image editing program. While the control point tool is active, the user can point to a location on the image to add a control point to the selected location. Image pixels surrounding the control point in a control point area within a predetermined distance from the point are modified by one or more edit operations associated with the control point. Some implementations can provide control point settings in response to the user selecting a control, e.g., settings control 706. For example, the control point settings can allow the user to select a desired control point area radius, shape of the control point area (circle, ellipse, rectangle, custom-shaped, etc.), and/or parameters of one or more associated edit operations that the control point will perform within its control point area, such as sharpening, brightness, saturation, and/or other edit operation.

The control point module also can display a menu 710, which can be similar to the menu 610 of FIG. 6. For example, the menu can be displayed after the user selects the control point icon 704, and/or can be displayed based on other conditions similar to those described above for FIG. 6. The menu 710 can present one or more selective default edit operations for the control point tool, and can present a selective last edit option 712 for a last edit operation. In some implementations, the default edit operations can be one or more edit operations assigned to the control point using the settings control 706. If a default edit operation is selected, the selective editing tool (e.g., control point tool) can apply that default edit operation to the image selectively. If the last edit option 710 is selected, similarly as described above for the brush tool of FIG. 6, the modification from the last edit operation that was applied to the image 402 is omitted from the image, similarly as described above and shown by the hatch pattern of FIG. 4 used in the image 402 of FIG. 7. In addition, the selection of the last edit option 712 causes the control point module to apply the last edit operation applied to the image 402 based on user input to the control point tool. In some implementations, any other edit operations that may be associated with or assigned to the control point tool by the control point settings control 706 can be applied within the control point area in addition to the selected last edit operation 712.

For example, after selecting the selective last edit option 712, the user selects a location in the image to cause a control point 714 to be placed on the image. The control point causes the pixels around it in a predefined control point area (e.g., within a predetermined distance of the control point) to be modified based on the last edit operation, which is shown in this example as pixels modified within a circular perimeter 716. In this example, the last edit operation was the drama filter applied in FIG. 5. Therefore, the same filter is applied within the perimeter 716 as shown by the hatching in perimeter 716 in FIG. 7. In the described implementation, the user can select the apply control 420 to cause the modification from the last edit operation to be saved to the image. Alternatively, the user can select the cancel control 422 or undo control 424 if the user does not want to keep the modification from the last edit operation.

In other implementations, other selective editing tools can be used with features described herein besides the brush tool and control point tool shown in FIGS. 6 and 7. For example, an image gradient tool can be used, where the user provides input to select one or more positions or areas on the image and cause a gradient to be applied to or based on the selected positions or areas of the image. For example, a user can use the gradient tool to select a beginning position or area in the image and an end position or area in the image such that the pixel values between these positions are to be modified to gradually change in one or more pixel values from the beginning position to the end position based on the associated edit operation. If a last edit operation option associated with the gradient tool (e.g., similar to option 612 or 712) is selected, the image gradient tool can modify the pixels in the manner of the last edit operation (or other previously-applied edit operation) to create a gradient in that modification. Similarly, the modification can be made according to the default edit operation, if it is selected. For example, the last edit operation can be applied with one set of parameters at the beginning position or area of the gradient, to be faded gradually according to default or user-specified parameters to the end position or area of the gradient having a different set of parameters (e.g., user specified or default parameters). For example, a brightness edit operation can be applied with a high magnitude parameter to modify the image with high brightness at the beginning position of the gradient, and the brightness can be gradually or continuously lowered in magnitude across a user-selected area of the image to the user-selected end position of the gradient having a low magnitude brightness parameter. In another example, the last edit operation can be applied at one position of the gradient, to be faded gradually (e.g., according to user-specified parameters) to a different edit operation, e.g., a default edit operation or an edit operation specified by the user, at the other position of the gradient. For example, application of a brightness edit operation can be gradually changed to application of a contrast edit operation.

A smart selection tool can also be used. For example, in some example implementations, a smart selection tool can be used similarly to the brush tool described above to modify pixels pointed to by the user, but only modifies pixels that are similar to the initially-selected reference pixel(s) or other designated pixels. For example, the modified pixels can be similar in color and/or other pixel values or characteristics to the reference pixel. In this case, the tool modifies similar pixels indicated by the user using the selected edit operation (e.g., the last edit operation or other previously-applied edit operation, or a default edit operation). The smart selection tool can be implemented to not modify pixels identified (e.g., pointed to) by the user that have dissimilar pixel values (e.g., based on predefined similarity thresholds in pixel values).

In some implementations, different editing modules can be selected for use in the interface 400. For example, the icon 404,504, 602, or 702 can be selectable to switch to a different editing module. For example, a menu of other editing modules to select can be displayed in a drop down menu or list.

In some implementations, a plurality of different selective editing tools (e.g., types of selective editing tools) are available for selection, and each of the selective editing tools can be associated with applying one of multiple available edit operations in the selective application described herein. Some examples are shown in FIGS. 5-7. Some types of selective editing tools can be associated with default edit operations, e.g., where one selective editing tool can be associated with a first default edit operation and another selective editing tool can be associated with a second, different default edit operation.

Figure 8:
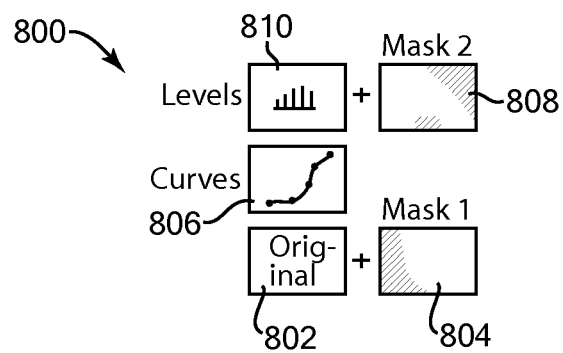
FIG. 8 is a diagrammatic illustration of one example of a list of edit operations.

FIG. 8 is a diagram illustrating an example list of edit operations 800 applied to an image using an editing program. For example, list 800 includes icons representing the edit operations and which are listed in a bottom-to-top order. In this example, a user has made selective modifications to particular areas of an image. To do this, the user creates a mask represented by icon 804 for an original image represented by icon 802 (or the image 802 is a layer created from an original image). Mask 804 is a separate image from original image 802 and is listed separately and in parallel to modifications to the image 802. Mask 804 is used to mask particular areas of the image which the user does not wish to modify with edit operations, e.g., where masked areas are indicated by shaded areas of the mask icon 804. The user used a manual tool such as a brush tool to modify the mask in the correct color to mask the desired areas of the image. The mask 804 can be merged with the original image 802 before performing edits to the original image 802.

The user then makes modifications on the image using an editing tool, such as curves drawn on the image using a tool as indicated by icon 806 in the same level of hierarchy (vertical alignment) as original image 802 and in a different level than the mask 804. Next, the user creates a second mask as indicated by icon 808 in the second level of hierarchy, to select different portions of the image for modification. Then the user adjusts the levels of one or more parameters of filters applied to the image, such as brightness or contrast, as indicated by icon 810 in the same level of the hierarchy as original image 802. These filters can be applied to the non-masked areas based on mask 808.

In another example, if a user wants to apply a "drama" filter to only a sky region of an image, the user creates a layer for the image and creates a mask associated with that layer using tools that relate to the mask (which is different than the layer). The tools may be a different class than tools used for the layers and masks, possibly requiring additional learning from the user.

In the example shown, the various tools, adjustment layers, alpha channels, and masks needed to selectively apply an edit operation can create a complicated, multi-dimensional array of edit operations in a hierarchy that is both hard to understand to a user and is also less convenient for operation and manipulation by the user.

Figure 9:
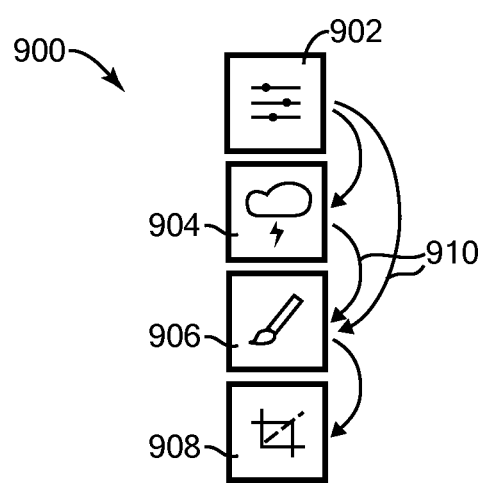
FIG. 9 is a diagrammatic illustration of an example of a list of multiple edit operations provided according to one or more features described herein.

FIG. 9 is a diagram illustrating an example list 900 of edit operations applied to an image using one or more features described herein. For example, a list similar to list 900 can be displayed to a user in a user interface of an image editing program or in another form, in some implementations. List 900 shows icons representing edit operations and other actions instructed by the user. A displayed list of edit operations can indicate to the user the edit operations that have previously been applied to the image, assisting the user in deciding whether to selectively apply a previously-applied edit operation and/or to select a previously-applied edit operation to remove and apply with the selective editing tool.

In this example, list 900 includes icons for some of the edit operations described previously in FIGS. 4, 5, and 6. For example, each icon can represent a filter module used as described above. A basic filter module icon 902 shows that a basic filter edit operation is the first edit operation applied in this sequence of edit operations using the basic filter module, e.g., an application of brightness, contrast, and/or saturation filters as described above with respect to FIG. 4. The next icon 904 shows that a special effect module edit operation was then applied to the image, e.g., the drama filter of FIG. 5. The next icon 906 in the list indicates that an edit operation has been applied to the image using the brush tool, as described above with respect to FIG. 6. The next icon 908 in the list indicates that a different type of edit operation of a different edit module was next applied to the image, such as a cropping, rotating, or resizing edit operation.

List 900 can show a linear sequence of edit operations based on the edit modules that are sequentially used to edit the image. In some implementations, any edit module can be used after any other edit module in the modular system of editing, and the list of icons can be presented in a single sequence, e.g., without parallel modifications or functions being performed or displayed in other levels of a hierarchy as in the example of FIG. 8 described above. Thus a previously-applied edit operation can be easily determined within the single sequence. List 900 can provide a greatly simplified list of edit operations to a user which can be easy to understand.

In some implementations, tools in edit modules such as the brush tool module 906 or other modules may not be strictly linear in their implementations. For example, the brush tool may receive inputs from the basic filter module 902 and the special effects module 904 to perform its selective application, as indicated by arrows 910. In some implementations, the brush tool may effectively create a selective mask for the drama filter used in special effects module 904 applied to the image (e.g., stored in memory) that has been modified by the basic filters module 902. Regardless of such multiple inputs, the application of the brush tool edit operation can be presented in a simple, sequential list 900.

In some implementations, a selection of one of the icons in list 900 can be received from a user. The modifications to the image using the selected edit operation can be removed. Further, modifications can then be applied to the image using the selective editing tool. For example, this allows the user to select a particular edit operation that was previously applied and to apply that edit operation selectively to local areas of the image.

One or more features described herein can provide various advantages in implementing an image editing system on various types of devices. For example, the user need only work with a list of edit modules. This allows editing program functions to be low-complexity and have a low learning curve, using one or more features described herein. In addition, using described features, a user can apply a complex effect on an image that may require a mask or alpha channel, for example, in systems providing edit operations of FIG. 8. Using described features, a user only needs to comprehend that, if desired, a selective editing tool can apply the last edit operation (e.g., last used module) instead of the usual edit operation of the selective editing tool. A sequential list of edit operations 900 allows the user to visualize a linear sequence of applied edit operations, without branches of operations or complex parallel side operations.

In addition, one or more described features allow efficiency in memory usage of the system implementing the image modifications. For example, during the adjustment, previewing, and/or final rendering of the interface or module using the selective editing tool, the resources of the system (e.g., central processing unit (CPU), graphics processing unit (GPU), memory) can be fully dedicated to the current selective edit operation, without having to calculate and store other related layers, mask layers, histograms, or other data for selective application of edit operations. As the user applies the edit operation selectively to the image using the selective editing tool, the system resources can be dedicated to the determination and rendering of the edit operation in the user-selected areas (e.g., this edit operation is masked from other areas of the image). This is because only the image with the selective edit operation applied and the previous image (with selective edit operation not applied) may need to be stored in memory, thus leaving other memory and resources available to the selective edit processing.

Furthermore, an image editing user interface can be easily learned and used when implementing one or more described features. For example, the interface need present only a small number of controls or widgets (e.g., options for the user) at any one time on a screen, decreasing user confusion. Some examples of the interface are described for FIGS. 4-7. Some features described herein allow a user to apply a particular edit operation first without regard to its selective application, thus reducing the number of controls and options to the user at that time. Then, the user can selectively apply that edit operation in a second step, in which the controls and options for that step are displayed in the interface. Thus the user confusion due to continual mixed use of filter parameter changes, application of edit operations, and selective use of an editing tool may be avoided.

In addition, a series of edit operations can be displayed as a single list, as described in examples with reference to FIG.

9. Even if there are more complex cross-references between edit operations, a simple list of edits can be shown to the user. This simplifies user comprehension of how a series of edit operations functions, and can allow for a simpler user interface and functional design of the image editing program for managing a series of edit operations applied to an image.

Figure 10:
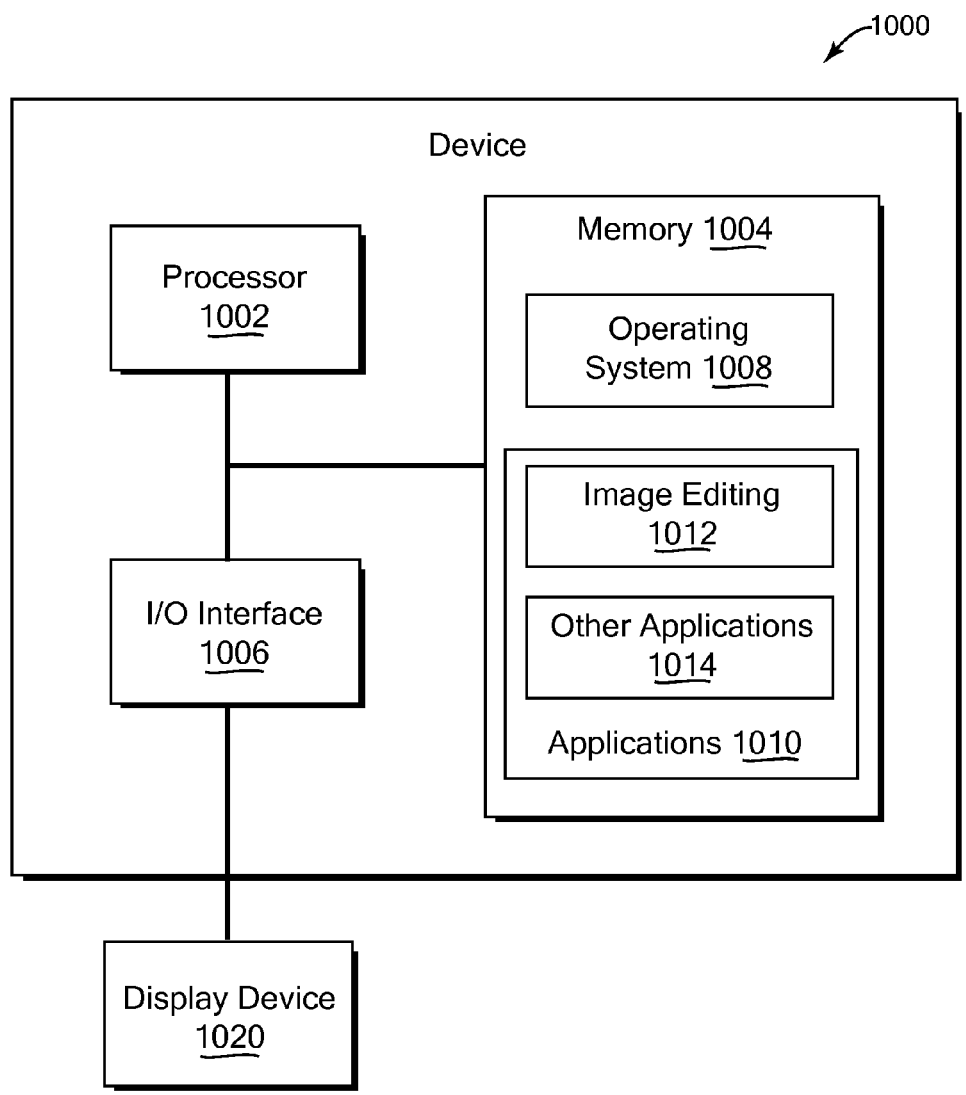
FIG. 10 is a block diagram of an example device which may be used for one or more implementations described herein.

FIG. 10 is a block diagram of an example device 1000 which may be used to implement one or more features described herein. In one example, device 1000 may be a computer device used to implement server device, e.g., server device 104 of FIG. 1, and perform appropriate method implementations described herein. Device 1000 can be any suitable computer system, server, or other electronic or hardware device. For example, the device 1000 can be a mainframe computer, desktop computer, workstation, portable computer, or electronic device (portable device (portable device, mobile device, cell phone, smart phone, tablet computer, television, TV set top box, personal digital assistant (PDA), media player, wearable device, game device, etc.). In some implementations, device 1000 includes a processor 1002, a memory 1004, and input/output (I/O) interface 1006.

Processor 1002 can be one or more processors or processing circuits to execute program code and control basic operations of the device 1000. A "processor" includes any suitable hardware and/or software system, mechanism or component that processes data, signals or other information. A processor may include a system with a general-purpose central processing unit (CPU), multiple processing units, dedicated circuitry for achieving functionality, or other systems. Processing need not be limited to a particular geographic location, or have temporal limitations. For example, a processor may perform its functions in "real-time," "offline," in a "batch mode," etc. Portions of processing may be performed at different times and at different locations, by different (or the same) processing systems. A computer may be any processor in communication with a memory.

Memory 1004 is typically provided in device 1000 for access by the processor 1002, and may be any suitable processor-readable storage medium, such as random access memory (RAM), read-only memory (ROM), Electrical Erasable Read-only Memory (EEPROM), Flash memory, etc., suitable for storing instructions for execution by the processor, and located separate from processor 1002 and/or integrated therewith. Memory 1004 can store software operating on the device 1000 by the processor 1002, including an operating system 1008 and one or more applications 1010 such as an image editing and/or processing engine, web hosting engine, social networking engine, etc. In some implementations, applications 1010 can include instructions that enable processor 1002 to perform the functions described herein, e.g., some or all of the methods of FIGS. 2-3. For example, applications 1010 can include one or more image editing applications 1012, including an image editing program to receive user input, modify pixels of images, and display the images on a display component of the device 1000. An image editing program, for example, can provide a displayed user interface responsive to user input to display selectable options/controls and images based on selected options. Other applications or engines 1014 can also or alternatively be included in applications 1010, e.g., media display applications, communication applications, web hosting engine or application, social networking engine or application, etc. Any of software in memory 1004 can alternatively be stored on any other suitable storage location or computer-readable medium. In addition, memory 1004 (and/or other connected storage device(s)) can store images, edit operations and parameters, and other instructions and data used in the features described herein. Memory 1004 and any other type of storage (magnetic disk, optical disk, magnetic tape, or other tangible media) can be considered "storage devices."

I/O interface 1006 can provide functions to enable interfacing the device 1000 with other systems and devices. For example, network communication devices, storage devices such as memory and/or database 106, and input/output devices can communicate via interface 1006. In some implementations, the I/O interface can connect to interface devices such as input devices (keyboard, pointing device, touchscreen, microphone, camera, scanner, etc.) and output devices (display device, speaker devices, printer, motor, etc.). A display device 1020 is one example of an output device that can be used to display content, e.g., one or more images provided in an image editing interface or other output application as described herein. Display device 1020 can be connected to device 1000 via local connections (e.g., display bus) and/or via networked connections and can be any suitable display device, some examples of which are described below.

For ease of illustration, FIG. 10 shows one block for each of processor 1002, memory 1004, I/O interface 1006, and software blocks 1008 and 1010. These blocks may represent one or more processors or processing circuitries, operating systems, memories, I/O interfaces, applications, and/or software modules. In other implementations, device 1000 may not have all of the components shown and/or may have other elements including other types of elements instead of, or in addition to, those shown herein. While system 102 is described as performing steps as described in some implementations herein, any suitable component or combination of components of system 102 or similar system, or any suitable processor or processors associated with such a system, may perform the blocks and operations described.

A client device can also implement and/or be used with features described herein, such as client devices 120-126 shown in FIG. 1. Example client devices can be computer devices including some similar components as the device 1000, such as processor(s) 1002, memory 1004, and I/O interface 1006. An operating system, software and applications suitable for the client device can be provided in memory and used by the processor, such as an image editing program, client communication application software, etc. The I/O interface for a client device can be connected to network communication devices, as well as to input and output devices such as a microphone for capturing sound, a camera for capturing images or video, audio speaker devices for outputting sound, a display device for outputting images or video, or other output devices. A display device 1020, for example, can be connected to (or included in) the device 1000 to display the images, interfaces, and other data as described herein, where such device can include any suitable display device such as an LCD, LED, or plasma display screen, CRT, television, monitor, touchscreen, 3-D display screen, projector, or other visual display device. Some implementations can provide an audio output device, such as voice output or synthesis that speaks text and/or describes settings, notifications, and permissions.

One or more methods described herein (e.g., methods 200 and/or 300) can be implemented by computer program instructions or code, which can be executed on a computer. For example, the code can be implemented by one or more processors (e.g., microprocessors or other processing circuitry), and can be stored on a computer program product including a non-transitory computer readable medium (e.g., storage medium), e.g., a magnetic, optical, electromagnetic, or semiconductor storage medium, including semiconductor or solid state memory, magnetic tape, a removable computer diskette, a random access memory (RAM), a read-only memory (ROM), flash memory, a rigid magnetic disk, an optical disk, a solid-state memory drive, etc. The program instructions can also be contained in, and provided as, an electronic signal, for example in the form of software as a service (SaaS) delivered from a server (e.g., a distributed system and/or a cloud computing system). Alternatively, one or more methods can be implemented in hardware (logic gates, etc.), or in a combination of hardware and software. Example hardware can be programmable processors (e.g. Field-Programmable Gate Array (FPGA), Complex Programmable Logic Device), general purpose processors, graphics processors, Application Specific Integrated Circuits (ASICs), and the like. One or more methods can be performed as part of or component of an application running on the system, or as an application or software running in conjunction with other applications and operating system.

One or more methods described herein can be run in a standalone program that can be run on any type of computing device, a program run on a web browser, a mobile application ("app") run on a mobile computing device (e.g., cell phone, smart phone, tablet computer, wearable device (wristwatch, armband, jewelry, headwear, goggles, glasses, etc.), laptop computer, etc.). In one example, a client/server architecture can be used, e.g., a mobile computing device (as a client device) sends user input data to a server device and receives from the server the final output data for output (e.g., for display). In another example, all computations can be performed within the mobile app (and/or other apps) on the mobile computing device. In another example, computations can be split between the mobile computing device and one or more server devices.

Although the description has been described with respect to particular implementations thereof, these particular implementations are merely illustrative, and not restrictive. Concepts illustrated in the examples may be applied to other examples and implementations. Similarly numbered items across multiple figures are equivalent or the same, and are not generally described again for brevity.

In situations in which the systems discussed here may collect personal information about users, or may make use of personal information, users may be provided with an opportunity to control whether programs or features collect user information (e.g., images depicting the user, information about a user's social network, user characteristics (age, gender, profession, etc.), social actions or activities, a user's preferences, or a user's current location). In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, a user may have control over how information is collected about the user and used by a server.

Note that the functional blocks, features, methods, devices, and systems described in the present disclosure may be integrated or divided into different combinations of systems, devices, and functional blocks as would be known to those skilled in the art. Any suitable programming language and programming techniques may be used to implement the routines of particular implementations. Different programming techniques may be employed such as procedural or object-oriented. The routines may execute on a single processing device or multiple processors. Although the steps, operations, or computations may be presented in a specific order, the order may be changed in different particular implementations. In some implementations, multiple steps or blocks shown as sequential in this specification may be performed at the same time.

What is claimed is:

1. A computer-implemented method for an image editing program, the method comprising:
    causing an image to be displayed;
    receiving user input to the image editing program, the user input indicative of selection of a first selective editing tool;
    in response to receiving the user input, determining that a first edit operation was previously applied to the image to cause a first modification to a first set of pixels of the image;
    determining whether the first edit operation was based on use of at least one of the first selective editing tool and a second selective editing tool, wherein the first selective editing tool and the second selective editing tool are configured to modify at least one pixel in at least one particular area of the image, wherein the at least one particular area excludes one or more other pixels of the image;
    in response to determining that the first edit operation was not based on use of the first selective editing tool and the second selective editing tool, restoring the image to a previous state in which the first modification to the first set of pixels of the image is omitted; and
    in response to restoring the image to the previous state, applying a second edit operation to one or more selected areas of the image exclusive of one or more unselected pixels of the image as indicated by manipulation of the first selective editing tool by the user input, wherein the applying causes a second modification to a second set of pixels in the one or more selected areas of the image.

2. The method of claim 1 further comprising causing the image to be displayed after applying the second edit operation to the one or more selected areas.

3. The method of claim 1 wherein the first edit operation is the same as the second edit operation, and wherein the first set of pixels is different than the second set of pixels.

4. The method of claim 1 further comprising, prior to the receiving, restoring, and applying:
    applying the first edit operation to the image to cause the first modification to the first set of pixels of the image.

5. The method of claim 1 wherein the first edit operation is
    a last edit operation applied to the image prior to the applying of the second edit operation to the one or more selected areas of the image.

6. The method of claim 1 further comprising causing a menu to be displayed, the menu including one or more options to select a particular edit operation of a plurality of edit operations for use with the first selective editing tool, wherein the plurality of edit operations were previously applied to the image,
    wherein the first edit operation is the particular edit operation applied to the image prior to the applying of the second edit operation and prior to applying one or more other edit operations of the plurality of edit operations.

7. The method of claim 1, wherein in response to determining that the first edit operation was based on use of at least one of the first selective editing tool and the second selective editing tool, maintaining the first modification in the image and applying the second edit operation to the one or more selected areas of the image as indicated by the manipulation of the first selective editing tool by the user input.

8. The method of claim 1, further comprising causing a menu to be displayed, wherein the menu includes one or more options, the one or more options including:
   a first option to apply a default edit operation using the first selective editing tool; and
   a second option to selectively apply the first modification of the first edit operation using the first selective editing tool,
   wherein the restoring the image to the previous state and the applying the second edit operation are performed in response to a selection of the second option by the user input indicative of the selection of the first selective editing tool.

9. The method of claim 1 wherein the user input manipulating the first selective editing tool is received while the first selective editing tool is active, wherein the user input identifies the one or more selected areas of the image.

10. The method of claim 8 further comprising causing one or more options to be displayed, the one or more options including a first option to select multiple edit operations that were previously applied to the image in a sequence,
   wherein a selection of the first option causes the restoring the image to the previous state and causes the second edit operation to selectively apply the multiple edit operations to the one or more selected areas based on the manipulation of the first selective editing tool.

11. The method of claim 1 wherein the first selective editing tool and the second selective editing tool each include at least one of: a brush tool, an image gradient tool, a control point tool, and a smart selection tool.

12. The method of claim 1 wherein the first selective editing tool includes a brush tool, wherein a number of pixels of the image in the one or more selected areas are identified by the user input using the brush tool and are modified based on the second edit operation applied to the one or more selected areas.

13. The method of claim 1 wherein the first selective editing tool includes a control point tool causing a control point to be located on the image based on the user input using the first selective editing tool, wherein applying the second edit operation to the one or more selected areas includes modifying pixels of the image around the control point within a predetermined distance of the control point.

14. The method of claim 1 wherein the first edit operation and the second edit operation include at least one of: a color modifier, a brightness modifier, a contrast modifier, a saturation modifier, a blur, a sharpness modifier, a noise modifier, and a special effect filter.

15. The method of claim 1 further comprising:
   displaying an indication of a sequence of multiple edit operations applied to the image prior to the applying of the second edit operation to the one or more selected areas, wherein the user input selects the second edit operation from the sequence of multiple edit operations prior to the restoring and the applying.

16. A system to provide an image editing program, the system comprising:
   a storage device; and
   at least one processor operative to access the storage device and configured to:
   receive first user input to the image editing program, the user input selecting a selective editing tool;
   in response to the selecting of the selective editing tool, cause an indication to be displayed of a sequence of multiple edit operations previously applied to an image, wherein each of the multiple edit operations caused a respective modification to one or more pixels of the image based on previous user input;
   receive a selection of a selected edit operation from the indication of the sequence of multiple edit operations based on second user input;
   in response to receiving the selection of the selected edit operation, restore the image to a state in which the modification resulting from the previous applying of the selected edit operation to the image is omitted;
   apply a second edit operation to one or more selected areas of the image as indicated by manipulation of the selective editing tool by third user input, wherein the one or more selected areas exclude at least one pixel of the image, wherein the second edit operation selectively applies the modification of the selected edit operation to the one or more selected areas of the image; and
   cause the image to be displayed, the image modified by the second edit operation applied to the one or more selected areas.

17. The system of claim 16 wherein the at least one processor is configured to restore the image to the previous state in response to determining that the selected edit operation has been previously applied to the image not based on use of one or more selective editing tools configured to modify fewer than all pixels of the image.

18. The system of claim 16 wherein the at least one processor is further configured to cause one or more options to be displayed, wherein the one or more options include a first option to select a plurality of edit operations of the multiple edit operations, wherein receiving the selection of the selected edit operation includes receiving a selection of the first option, wherein the selected edit operation is included in the plurality of edit operations, wherein the second edit operation selectively applies modifications from the plurality of edit operations to the one or more selected areas of the image in an order based on the sequence of the multiple edit operations.

19. A non-transitory computer readable medium having stored thereon instructions to implement an image editing program and, when executed by a processor, cause the processor to:
   receive first user input selecting a selective editing tool;
   in response to the selecting of the selective editing tool, causing one or more options to be displayed, wherein the one or more options include a first option to select a plurality of edit operations previously applied to an image, wherein each of the plurality of edit operations caused a respective modification to one or more pixels of the image based on previous user input;
   restore the image to a previous state in which the modifications resulting from the previous applying of the plurality of edit operations to the image are omitted;
   apply a second edit operation to one or more selected areas of the image as indicated by manipulation of the selective editing tool by second user input to cause a selective modification to the image in the one or more selected areas, wherein the second edit operation selectively applies the modifications of the plurality of edit operations to the one or more selected areas of the image; and cause the image including second modification to be displayed.

20. The non-transitory computer readable medium of claim 19 wherein the processor is caused to restore the image to the previous state is response to determining that the plurality of edit operations were previously applied to the image not based on use of one or more selective editing tools configured to selectively modify fewer than all pixels of the image.

* * * * *